(12) United States Patent
Briggs

(10) Patent No.: US 8,197,675 B2
(45) Date of Patent: Jun. 12, 2012

(54) PROCESS FOR REMOVING CONTAMINANTS FROM HYDROCARBON OBTAINED FROM RECYCLED MATERIALS

(76) Inventor: Wilmer Lee Briggs, Ridgefield, WA (US)

(*) Notice: Subject to any disclaimer, the term of this patent is extended or adjusted under 35 U.S.C. 154(b) by 538 days.

(21) Appl. No.: 12/421,670

(22) Filed: Apr. 10, 2009

(65) Prior Publication Data

US 2009/0227825 A1 Sep. 10, 2009

Related U.S. Application Data

(63) Continuation-in-part of application No. 10/632,501, filed on Aug. 1, 2003, now abandoned.

(51) Int. Cl.
  *C10G 25/12* (2006.01)
  *C07C 7/12* (2006.01)
(52) U.S. Cl. ............ 208/305; 208/208 R; 208/254 R; 585/826
(58) Field of Classification Search ............ 208/208 R, 208/254 R, 305; 585/826
See application file for complete search history.

(56) References Cited

U.S. PATENT DOCUMENTS

| | | | |
|---|---|---|---|
| 2,387,936 A | 10/1945 | Nicholls et al. ............ 502/47 |
| 3,043,771 A | 7/1962 | Bloch ............ 585/240 |
| 3,080,436 A * | 3/1963 | King et al. ............ 585/823 |
| 3,506,409 A | 4/1970 | Hutson, Jr. ............ 585/818 |
| 3,787,330 A | 1/1974 | Sugahara et al. ............ 502/72 |
| 3,930,988 A | 1/1976 | Johnson ............ 208/182 |
| 4,208,252 A | 6/1980 | Yoshida et al. ............ 201/2.5 |
| 4,234,388 A | 11/1980 | Mallan et al. ............ 201/25 |
| 4,300,009 A | 11/1981 | Haag et al. ............ 585/408 |
| 4,383,915 A | 5/1983 | Johnson ............ 208/183 |
| 4,411,774 A | 10/1983 | Johnson ............ 208/179 |
| 4,498,992 A | 2/1985 | Garrett, Jr. ............ 210/664 |
| 4,502,948 A | 3/1985 | Tabler ............ 208/183 |
| 4,795,482 A * | 1/1989 | Gioffre et al. ............ 95/141 |
| 4,851,601 A | 7/1989 | Fukuda et al. ............ 585/241 |
| 4,982,027 A | 1/1991 | Korff et al. ............ 585/241 |
| 4,983,278 A | 1/1991 | Cha et al. ............ 208/407 |
| 5,055,167 A | 10/1991 | Dummersdorf et al. ...... 204/165 |
| 5,079,385 A | 1/1992 | Wu ............ 585/241 |
| 5,414,169 A | 5/1995 | Takahashi et al. ............ 585/241 |
| 5,608,136 A | 3/1997 | Maezawa et al. ............ 588/228 |
| 5,611,912 A | 3/1997 | Han et al. ............ 208/58 |
| 5,780,696 A | 7/1998 | Bauer ............ 585/241 |
| 5,811,606 A | 9/1998 | Yang ............ 585/241 |
| 5,824,193 A | 10/1998 | Edwards ............ 201/7 |
| 5,871,618 A | 2/1999 | Lee et al. ............ 196/46.1 |
| 5,900,155 A | 5/1999 | Bedi ............ 210/739 |
| 5,969,201 A | 10/1999 | Kalnes et al. ............ 585/241 |
| 5,998,682 A | 12/1999 | Chien ............ 585/241 |
| 6,024,880 A * | 2/2000 | Ciora et al. ............ 210/653 |
| 6,172,275 B1 | 1/2001 | Tadauchi et al. ............ 588/228 |
| 6,184,427 B1 | 2/2001 | Klepfer et al. ............ 585/241 |
| 6,436,168 B1 | 8/2002 | Uematsu et al. ............ 75/471 |
| 6,482,371 B1 | 11/2002 | Rasmussen ............ 423/1 |
| 6,534,689 B1 | 3/2003 | Stankevitch ............ 585/241 |
| 6,653,517 B2 | 11/2003 | Bullock ............ 585/241 |
| 2002/0156332 A1 | 10/2002 | Jiang ............ 585/240 |
| 2002/0173682 A1 | 11/2002 | Tullio et al. ............ 585/240 |
| 2003/0050519 A1 | 3/2003 | Cheng ............ 585/241 |
| 2003/0127310 A1 | 7/2003 | Lemmons et al. ............ 202/96 |
| 2003/0127312 A1 | 7/2003 | Lemmons et al. ............ 202/96 |
| 2003/0130548 A1 | 7/2003 | Lemmons et al. ............ 585/241 |

FOREIGN PATENT DOCUMENTS

| | | |
|---|---|---|
| FR | 2 357 630 | 2/1978 |
| GB | 228162 | 1/1925 |
| GB | 1 594 879 | 8/1981 |
| GB | 2 099 847 A | 12/1982 |
| JP | 08269460 A | 10/1996 |
| JP | 2001191051 A | 7/2001 |
| WO | 92/18590 | 10/1992 |

* cited by examiner

*Primary Examiner* — Randy Boyer
(74) *Attorney, Agent, or Firm* — Renner, Otto, Boisselle & Sklar

(57) ABSTRACT

A process for removing a contaminant from a hydrocarbon containing a first quantity of the at least one contaminant, including contacting the hydrocarbon with a clay packed in a column, at least a portion of the contaminant bing sorbed by the clay and forming a clay-contaminant adduct; removing the hydrocarbon from the column, the removed hydrocarbon having a second, reduced quantity of the at least one contaminant; heating the clay and the clay-contaminant adduct in the column to regenerate the clay material, the heating being carried out without removing the clay from the column; and re-using the regenerated clay material in further iterations of the process.

18 Claims, 6 Drawing Sheets

PROCESS FOR REMOVING CONTAMINANTS FROM HYDROCARBON OBTAINED FROM RECYCLED MATERIALS

CROSS-REFERENCE TO RELATED APPLICATION

The present application is a continuation-in-part and claims priority and benefit under 35 U.S.C. §120 to U.S. application Ser. No. 10/632,501, filed 1 Aug. 2003, now abandoned, the entirety of which is hereby incorporated by reference.

FIELD OF THE INVENTION

The present invention relates to a process for removing contaminants from hydrocarbon-containing materials obtained from recycled materials, and for providing improved hydrocarbons from recycled materials having reduced content of such contaminants. More particularly, the present invention relates to methods for removing contaminants from hydrocarbon-containing materials in order to provide hydrocarbons and blending such hydrocarbons with other recycled hydrocarbon materials to obtain refinery-grade hydrocarbon materials suitable for use, e.g., as fuel in motor vehicle engines and industrial boilers and heat-generating systems, as lubricants and as solvents.

TECHNICAL BACKGROUND

A long recognized need exists for suitable recycling methods for polymeric materials, such as thermoplastics. A wide variety of methods have been proposed and attempted. The art has developed to a point at which polymeric materials can be converted into combustible hydrocarbon-containing materials at reasonable material conversion efficiencies. However, while combustible, these hydrocarbon-containing materials may have low economic value due to contaminants derived from the original polymeric or other organic source materials, which are referred to herein as "polymer-derived contaminants" for specifically polymer-derived contaminants, and more generally as "source-derived contaminants" for contaminants originating from the polymeric or other organic source. Such source-derived contaminants include, for example, one or more of an organic chlorine compound, a nitrogen compound, sulfur or an organic or inorganic sulfur compound, color, or an offensive or non-hydrocarbon odor. The presence of such polymer-derived or source-derived contaminants reduces the value of the recovered hydrocarbon-containing materials.

Recent developments have greatly expanded the possible recycled materials which may be the source for such recycled hydrocarbon-containing materials, although such materials still contain source-derived contaminants which need to be removed. For example, as disclosed in "Anything Into Oil", DISCOVER, Vol. 24, No. 5 (May 2003), waste such as turkey guts can serve as a source for such recycled hydrocarbon-containing materials. As disclosed in this article, many other materials such as manure, crop residuals and polymeric materials such as PVC are considered candidates for recycling by the methods in the article. As noted above, a number of methods exist for recycling polymeric materials by decomposing them to hydrocarbon-containing materials.

As used herein, the term "other organic materials" generally refers to materials such as animal offal, manure, crop residuals and plant material which may be recycled by methods such as described in the above DISCOVER article. As used herein, the term "other organic materials" does not include polymeric materials (such as PET and PVC) and does not include petroleum-derived materials (such as recycled lubricating oils), each of which is separately identified herein.

Although not specifically discussed in the published information regarding such recycling processes as disclosed in the above DISCOVER article, the hydrocarbon-containing materials obtained from these processes are expected to contain contaminants derived from the particular organic source from which the hydrocarbon-containing materials originated. Thus, herein, such contaminants are generally referred to as "source-derived contaminants". The term "source-derived contaminants" includes any such contaminant originating in the source material, and includes polymer-derived contaminants as a sub-group, and includes other organic-derived contaminants as a sub-group. As used herein, a contaminant is an impurity or other non-hydrocarbon material which detracts from the value of the recycled hydrocarbon-based material for its intended use.

One of the major stumbling blocks in recycling polymeric materials is the need to sort mixed polymeric materials if they are to be directly recycled for use in making new articles from the recycled polymeric material. If polymeric materials could be sorted according to the polymer, they could be more directly recycled into useable polymeric materials, and the problem of contaminants could be reduced or avoided. In most instances, sorting is uneconomically expensive, since it usually requires human action. Thus, recycling polymeric materials has devolved into methods which do not require sorting. In doing so, the various monomers, additives and other chemical species present in the various polymeric materials become combined. As a result, the products obtained from such recycling include a number of the polymer-derived contaminants originating from the various polymers. For example, PVC yields chlorine compounds, nylons yield nitrogen compounds, and polysulfides yield sulfur compounds. The presence of such non-hydrocarbon atoms in the recycled materials contributes to odor, color, corrosivity and other undesirable features of, e.g., recovered hydrocarbon-containing materials.

A number of variables exist with respect to fuels such as diesel fuel. For diesel, such variables include, for example, cetane number, API gravity, BTU content, distillation range, sulfur content, stability and flash point. In addition, in colder weather, cloud point and low temperature filter plugging point may be critical factors. The most important measures of fuel quality include API gravity, heat value (BTU content), distillation range and viscosity. However, these measures relate to conventional diesel fuels obtained from petroleum refining. Hydrocarbon materials obtained from other sources, such as recycled polymeric materials or recycled lubricating oils, fuels, etc., may contain contaminants, such as those noted above, and/or other outside-specification materials, such as high- or low-boiling constituents, which are not normally found in hydrocarbon fractions or finished fuels obtained from conventional petroleum sources.

Recycled hydrocarbon-containing materials may have a heat content, e.g., about 19,000 BTU/pound or higher, sufficient for use as a fuel. Typical diesel fuel has a lower heating value of 132,000 BTU/gal (36.6 MJ/L), which corresponds to about 19,050 BTU/lb at 6.93 lb/gal at sp. gr. 0.83 for diesel fuel.

However, in spite of suitable heat value, recycled hydrocarbon-containing materials generally have such low commercial value as to make the overall recycling process unprofitable. The reason these recycled hydrocarbon-containing materials have such low commercial value is that the materials include high levels of the above-noted contaminants which are residuals from the sources, such as polymeric materials or other sources. Such contaminants make the hydrocarbon-containing materials unsuitable for use in motor vehicle engines or in other uses in which the content of the source-derived contaminants result in problems with equipment (e.g., chlorine compounds), or environmental problems (e.g., nitrogen compounds, sulfur and sulfur compounds), or problems with consumer acceptance (e.g., extremely disagreeable and/or non-hydrocarbon odor). An additional problem with such recycled polymeric materials is that the combustible hydrocarbon material obtained often one or more off-specification characteristic relating to use as a motor vehicle fuel. For example, a fuel intended for use as a diesel fuel may have an unacceptably low or high flash point for its intended use. Such fuels may be useful for some purposes, but refinery-grade fuels generally include a narrower range of materials. The many high- or low-molecular weight materials in such recycled polymeric materials may make the combustible hydrocarbon unsuitable for use as a motor vehicle fuel. In addition, the hydrocarbon-containing materials may have a noxious scent, and in some cases, the noxious scent may be so bad as to render the materials valueless or at least to substantially reduce their value.

As a result of such deficiencies, currently available recycled hydrocarbon-containing materials obtained from polymeric materials such as thermoplastics, or from other organic materials such as turkey offal, may have a commercial value which is lower than the costs of recovering such materials, making it uneconomical and undesirable to attempt to recover such materials. Such deficiencies with the currently available combustible hydrocarbon materials obtained from recycled polymeric materials may reduce the value of the combustible hydrocarbon material to, e.g, about US$0.20/ US gallon (at the time of filing this application), which may mean that the recycling is unprofitable.

Clay filtration has been used to clean up oils recovered from crankcase oils, hydraulic oils and other used oil sources. However, such processes generally require the presence of special treatment steps, the use of additives such as catalysts, solubilizing agents, etc. Such processes have not been applied to materials such as hydrocarbon-containing materials obtained from thermal decomposition of polymeric and other recycled materials, in which the hydrocarbon-containing materials comprise one or more source-derived contaminant.

In addition to processes for recycling polymeric materials such as thermoplastics, there has existed at least since the dawn of the automobile era a need for recycling lubricating materials associated with automobiles, trucks, and other combustion based engines such as locomotive engines and ship engines. Such lubricating materials include, for example, engine crankcase oil, lubricating oil, transmission oil, gear oil, and similar petroleum-based or synthetic hydrocarbon lubricating materials.

A number of processes have been developed for recycling such petroleum-based or synthetic hydrocarbon lubricating materials. As with the recycling of polymeric materials, these processes generally leave something to be desired, such as low efficiency, low usability or low user/consumer acceptability of the products. For example, in order to obtain a motor vehicle-usable grade fuel from such sources, it is often necessary to remove contaminants which may include additives, and decomposition products and heavy metals accumulated in the lubricant during its use, and it is often necessary to "crack" such hydrocarbon materials in order to obtain lower molecular weight components. As is known, cracking may require the presence of hydrogen and also may result in the formation of heavy tars and coke. When such lubricating materials are mixed together and recycled, due to the high molecular weight components, the flash point of the resulting recycled hydrocarbon material may be too high to be useful as a fuel for automobiles, trucks and other land vehicles, leaving only low-grade uses, such as bunker fuel as a possible use.

Accordingly, a need exists for processes which are capable of removing the contaminants from combustible hydrocarbon-containing materials obtained from recycled polymeric materials, in which the processes are economical and are capable of producing a fuel suitable for use in a motor vehicle, and in particular for processes which are capable of producing a refinery-grade fuel such as diesel which meets the appropriate ASTM, API and/or SAE standards.

SUMMARY OF THE INVENTION

The present invention addresses the problems of the prior art relating to recycling polymeric and other organic materials and relating to recycling lubricating oils, resulting in the provision of a process for preparing refinery-grade fuel which meets API and SAE standards, using recycled starting materials including polymeric materials, petroleum-based materials and other organic materials.

In one embodiment, the present invention relates to a process for removing at least one contaminant from a hydrocarbon containing a first quantity of the at least one contaminant, including contacting the hydrocarbon with a clay packed in a column at a temperature in the range from about 50° C. to about 180° C., wherein at least a portion of the at least one contaminant is sorbed by the clay and a clay-contaminant adduct is formed; removing the hydrocarbon from the column, wherein the removed hydrocarbon comprises a second quantity of the at least one contaminant, the second quantity being less than the first quantity; heating the clay and the clay-contaminant adduct in the column to a temperature in a range from about 400° C. to about 815° C. to regenerate the clay material, wherein the heating is carried out without removing the clay from the column; and re-using the regenerated clay material in further iterations of the process.

In one embodiment, the process for removing at least one contaminant from a hydrocarbon containing a first quantity of the at least one contaminant, includes contacting the hydrocarbon with a clay packed in a column, wherein the hydrocarbon is flowed through the clay and at least a portion of the at least one contaminant is sorbed by the clay and a clay-contaminant adduct is formed; removing the hydrocarbon from the column, wherein the removed hydrocarbon comprises a second quantity of the at least one contaminant, the second quantity being less than the first quantity and wherein the clay retains residual hydrocarbon; heating a portion of the clay and the clay-contaminant adduct in the column in the presence of air to a temperature at which the residual hydrocarbon ignites and undergoes combustion with the air, wherein the heating and combustion is carried out while the clay remains packed in the column; and re-using the regenerated clay material in further iterations of the process.

In one embodiment, the column is a first column of a plurality of columns, each column packed with clay, and the process further comprises flowing the hydrocarbon into a second column of the plurality of columns during the heating of the first column.

In one embodiment, at least a portion of the contaminant undergoes combustion with the residual hydrocarbon. In one embodiment, substantially all combustible contaminants are fully combusted. The combustion re-opens pores in the clay and thereby regenerates the clay for subsequent re-use in the process of the present invention.

In one embodiment the air is admitted to the column prior to and during the heating.

A feature of the present invention is that the clay used to remove the one or more contaminants can be regenerated in situ, that is, while the clay remains packed in the column in the same packed condition in which and in the same location at which it is used to contact the hydrocarbon and remove the contaminants from the hydrocarbon. This feature avoids the necessity of removing the clay, carrying out the regeneration in some other apparatus, and then re-packing the clay into the column for re-use. This is a significant advance over any known prior art processes, and when this is coupled with the ability to remove substantially all of the contaminants in the hydrocarbon material subjected to the inventive process, a much more facile, economically advantageous process of removing one or more contaminants from, e.g., recycled oil, is provided.

In one embodiment, the present invention relates to a process for removing a contaminant from a liquid obtained by thermally decomposing mixed polymeric materials, including filtering the liquid with a clay. In one embodiment, the clay is Fuller's earth and/or an activated acidic clay. In one embodiment, the liquid is a hydrocarbon-containing material containing source-derived contaminants, and in another embodiment, the liquid is a hydrocarbon-containing material containing polymer-derived contaminants.

In one embodiment, the present invention relates to a process for removing a source-derived contaminant from a hydrocarbon-containing material, including contacting the hydrocarbon-containing material with a clay in a filter apparatus, at least part of the source-derived contaminant being sorbed by the clay; and removing hydrocarbon-containing material from the filter apparatus, wherein the removed hydrocarbon-containing material includes a reduced amount of the source-derived contaminant. In one embodiment, the source-derived contaminant is a polymer-derived contaminant, and in another embodiment, the source-derived contaminant is derived from other organic material, as defined herein.

In another embodiment, the present invention relates to a process for producing refinery-grade hydrocarbons from polymeric materials, including:

(a) thermally decomposing polymeric material to obtain a first hydrocarbon-containing material including one or more polymer-derived contaminant;

(b) contacting the first hydrocarbon-containing material with a clay material to form a clay-hydrocarbon-containing material mixture whereby at least a portion of the polymer-derived contaminant is sorbed by the clay material to form a clay-contaminant adduct; and (c) separating a second hydrocarbon-containing material from the mixture, in which the second hydrocarbon-containing material contains a reduced amount of the polymer-derived contaminant.

In one embodiment, the polymeric materials are recycled. In one embodiment, the process further includes (d) heating the clay material and the clay-contaminant adduct to an elevated temperature to regenerate the clay material. In another embodiment, the process further includes (e) providing the regenerated clay material from (d) to (b). In one embodiment, the steps (a)-(d), and in another embodiment, the steps (a)-(e), may be repeated one or more times.

In one embodiment, the process further includes (f) blending the second hydrocarbon-containing material with another hydrocarbon to obtain a refinery-grade hydrocarbon. In one embodiment, the steps (a)-(f) may be repeated one or more times.

In another embodiment, the present invention relates to a process for producing a hydrocarbon suitable for use in a motor vehicle from recycled polymeric or other organic material, including:

(a) providing a first hydrocarbon-containing material obtained from thermal decomposition of recycled polymeric or other organic material, the first hydrocarbon-containing material including one or more source-derived contaminant;

(b) contacting the first hydrocarbon-containing material with a clay material to form a clay-hydrocarbon-containing material mixture whereby at least a portion of the source-derived contaminant is sorbed by the clay material to form a clay-contaminant adduct;

(c) separating a second hydrocarbon-containing material from the mixture, in which the second hydrocarbon-containing material contains a reduced amount of the source-derived contaminant, in which the second hydrocarbon-containing material has one or more off-specification characteristic relating to use in a motor vehicle;

(e) providing another hydrocarbon material, in which the another hydrocarbon material has one or more characteristic for offsetting the one or more off-specification characteristic; and (f) blending the second hydrocarbon-containing material with the another hydrocarbon to obtain a hydrocarbon in which the one or more characteristic is within specification for use in a motor vehicle.

In one embodiment, the process is continuous and further includes (g) repeating steps (a)-(f). In one embodiment, the use in a motor vehicle may include use as one or more of a fuel, a lubricant or a hydraulic fluid.

In another embodiment, the present invention relates to a process for producing a hydrocarbon suitable for a desired use from a recycled polymeric or other organic material, including:

(a) providing a first hydrocarbon-containing material obtained from thermal decomposition of a recycled polymeric or other organic material, the first hydrocarbon-containing material including one or more source-derived contaminant;

(b) contacting the first hydrocarbon-containing material with a clay material to form a clay-hydrocarbon-containing material mixture whereby at least a portion of the source-derived contaminant is sorbed by the clay material thereby forming a clay-contaminant adduct;

(c) separating a second hydrocarbon-containing material from the mixture, in which the second hydrocarbon-containing material contains a reduced amount of the source-derived contaminant, and in which the hydrocarbon-containing material has one or more characteristic requiring adjustment for a desired use;

(e) providing another hydrocarbon material, in which the another hydrocarbon material has one or more characteristic for offsetting the one or more characteristic requiring adjustment; and (f) blending the second hydrocarbon-containing material with the another hydrocarbon to obtain a blended hydrocarbon-containing material in which the one or more characteristic is within specification for the desired use.

In one embodiment, the process further includes (d) heating the clay and the clay-contaminant adduct to a temperature in a range from about 400° C. to about 815° C. to regenerate the clay material, and providing the regenerated clay material from (d) to (b).

In one embodiment, the process is carried out on a continuous basis and further includes (g) repeating steps (a)-(f).

In one embodiment, the steps (e) and (f) may be carried out prior to step (b), so that the another hydrocarbon is provided and is blended with the first hydrocarbon-containing material to obtain a blended hydrocarbon-containing material rather than with the second hydrocarbon-containing material. The blended hydrocarbon-containing material may then be carried through the remaining steps of the process, resulting in the production of a second hydrocarbon-containing material containing a reduced amount of the source-derived contaminant and having the one or more characteristic within specification for a desired use.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION

Figure 1:
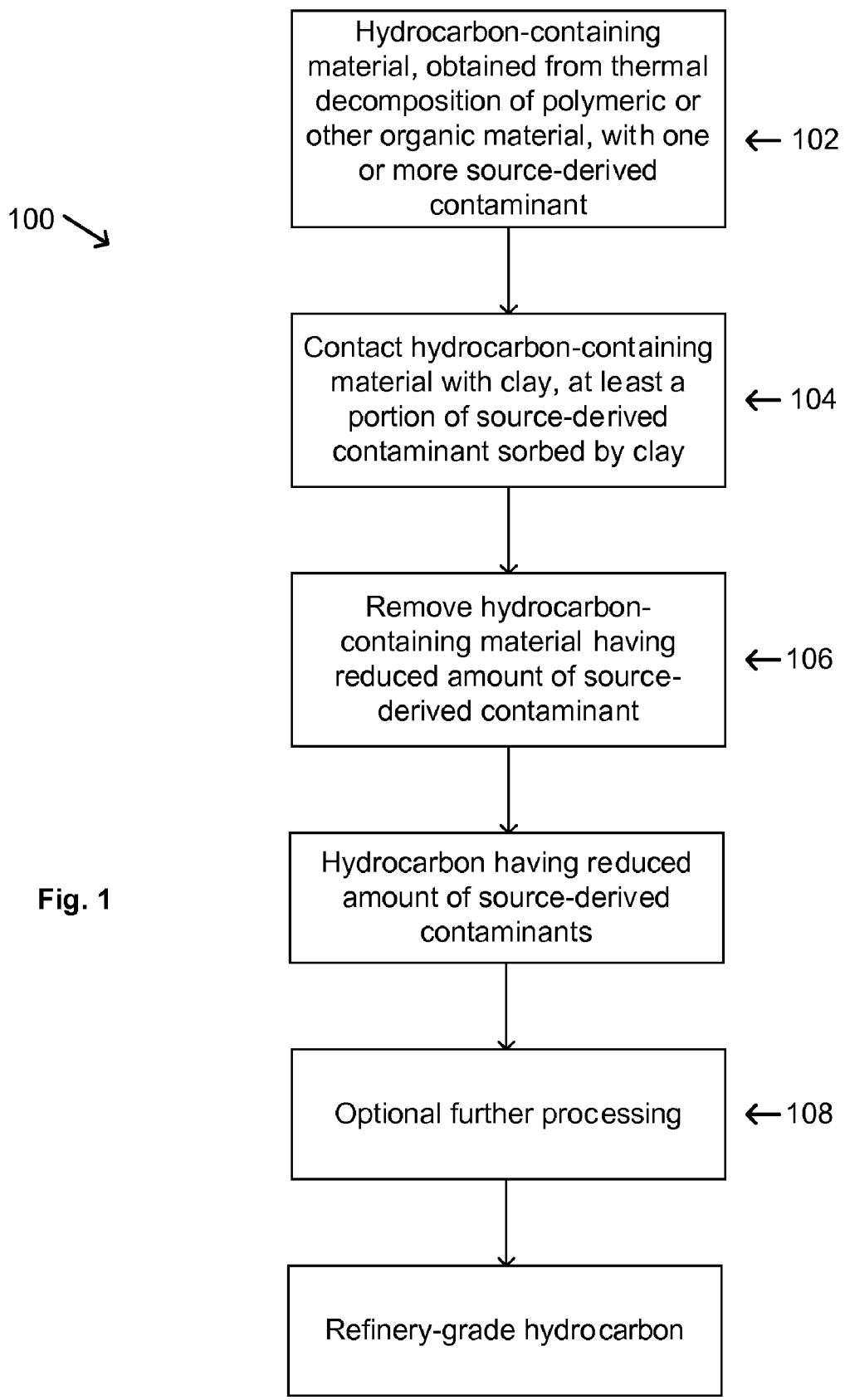
FIG. 1 is a schematic process flow diagram of a first embodiment of a process in accordance with the present invention.

The present invention, in one embodiment provides a process for treating hydrocarbon-containing materials obtained from recycled polymeric or other organic materials such as consumer plastics. The process is capable of removing contaminants found in such hydrocarbon-containing materials. The process is economical and are capable of producing a hydrocarbon material for a particular desired use, e.g., a refinery-grade hydrocarbon material, and in one embodiment, for producing a fuel-grade hydrocarbon which meets the appropriate API and SAE standards for use as, e.g., a diesel fuel or gasoline and for producing lubricating oils and hydrocarbon materials for other desired uses. In other embodiments, the hydrocarbon-containing material produced by the process of the present invention is suitable for uses such as lubricants and solvents.

In general, the present invention relates to a process for removing source-derived impurities from hydrocarbon-containing materials obtained by thermally decomposing polymeric or other organic materials, such as recycled thermoplastics, animal offal, etc. In particular, in one embodiment, the present invention is useful in removing polymer-derived impurities from hydrocarbon-containing materials obtained by thermally decomposing mixed, or un-sorted, polymeric materials, such as mixed thermoplastics and thermosets, including for example, polyethylene, polyethylene terephthalate, polyvinyl chloride, polyamides, polysulfides, etc. As will be understood, such polymeric materials include a variety of non-hydrocarbon atoms, thus forming a source for contaminants when the polymeric materials are thermally decomposed to yield hydrocarbon-containing materials for use, e.g., in fuels.

In another embodiment, the invention is useful in removing source-derived contaminants from hydrocarbon-containing materials obtained by thermally decomposing organic materials such as wastes from meat and food processing plants, crop residuals, other plant residuals, and virtually any organic material which contains fats, oils, hydrocarbons, and other carbonaceous materials which can be decomposed thermally to yield hydrocarbon-containing materials. As will be understood, these other organic source materials include a variety of atoms other than hydrogen and carbon, thus forming a source for contaminants when the organic materials are thermally decomposed to yield hydrocarbon-containing materials for use, e.g., in fuels. Any of the atoms in such materials other than hydrogen and carbon can be included within the source-derived contaminants as defined herein.

Thus, in one embodiment, the present invention relates to a process for removing one or more polymer-derived contaminant from a hydrocarbon-containing material, including contacting the hydrocarbon-containing material including the one or more polymer-derived contaminant with a clay in a filter apparatus, in which at least part of the polymer-derived contaminant is sorbed by the clay; and thereafter removing the hydrocarbon-containing material from the filter apparatus. The removed hydrocarbon-containing material obtained from the filter apparatus includes a reduced amount of the polymer-derived contaminant, as a result of these process steps.

FIG. 1 is a schematic flow diagram illustrating a process in accordance with this embodiment of the present invention.

In the first step of the method shown in FIG. 1, shown as step 102, a hydrocarbon-containing material is provided. The hydrocarbon-containing material is obtained from the thermal decomposition of a polymeric or other organic material. The hydrocarbon-containing material includes one or more contaminant originating in the source material, i.e., the polymeric or other organic material which served as the source for the hydrocarbon-containing material. Details relating to this step are set forth below with respect to the second embodiment. As noted herein, this embodiment of the invention is not limited to any one method for obtaining the hydrocarbon-containing material which comprises one or more source-derived contaminants.

In the second step of the method according to this embodiment of the invention, shown schematically in FIG. 1 as step 104, the hydrocarbon-containing material is contacted with clay. In this step, at least a portion of the source-derived contaminant is sorbed by the clay. Thus, the source-derived contaminant and the clay form a clay-contaminant adduct. Details relating to this step are set forth below with respect to the second embodiment. In general, in this step, the source-derived contaminants become sorbed onto the clay material so that the hydrocarbon-containing material can be separated from the clay-contaminant adduct and the remainder of the clay.

As used herein, the term "sorb", and cognate terms such as sorption, includes such actions or processes generally, including absorption, adsorption, persorption, physical trapping and similar physical processes by which the contaminants may be removed or separated from the hydrocarbon-containing material by being taken up and held by the clay. "Sorption" or "sorb" refers to a phenomenon involving the binding of one substance to another by any mechanism, of which those mentioned above are exemplary, when the exact nature of the sorbing phenomenon may not be clearly known, such as in the present process.

The clay sorbs at least some of the source-derived contaminants, and thereby acts to trap those contaminants, separating them from the hydrocarbon-containing material. The present inventor has discovered that by use of the process described herein, such source-derived contaminants can be effectively removed from the hydrocarbon-containing materials which were previously difficult to use or unacceptable for many uses due to a high level of such contaminants.

In the third step of the method according to this embodiment of the invention, shown schematically in FIG. 1 as step 106, the hydrocarbon-containing material is removed from the apparatus in which it was mixed with the clay. The hydrocarbon-containing material removed in this step contains a reduced amount of the source-derived contaminant compared to the hydrocarbon-containing material provided in step 102, as shown in FIG. 1.

As shown in FIG. 1, following step 106, a hydrocarbon material having a reduced amount of source-derived contaminants is obtained. At this point, in one embodiment of the present invention, the process is complete.

In another embodiment, the hydrocarbon material having a reduced amount of source-derived contaminants obtained from step 106 may be further processed, as shown in FIG. 1 as step 108. Such further processing may include, for example, further refining, mixing and/or blending with additional hydrocarbon materials or other additives as needed for the intended use of the hydrocarbon material. In one embodiment, as shown in FIG. 1, as a result of the optional further processing, a refinery-grade hydrocarbon material may be obtained.

In another embodiment, the process according to the present invention provides a refinery-grade hydrocarbon from a polymeric material, including (a) thermally decomposing a polymeric material to obtain a first hydrocarbon-containing material including one or more polymer-derived contaminant; (b) contacting the first hydrocarbon-containing material with a clay material to form a clay-hydrocarbon-containing material mixture, whereby at least a portion of the polymer-derived contaminant is sorbed by the clay material to form a clay-contaminant adduct; and (c) separating a second hydrocarbon-containing material from the mixture, in which the second hydrocarbon-containing material contains a reduced amount of the polymer-derived contaminant. In one embodiment, the polymeric material is a recycled polymeric material.

Figure 2:
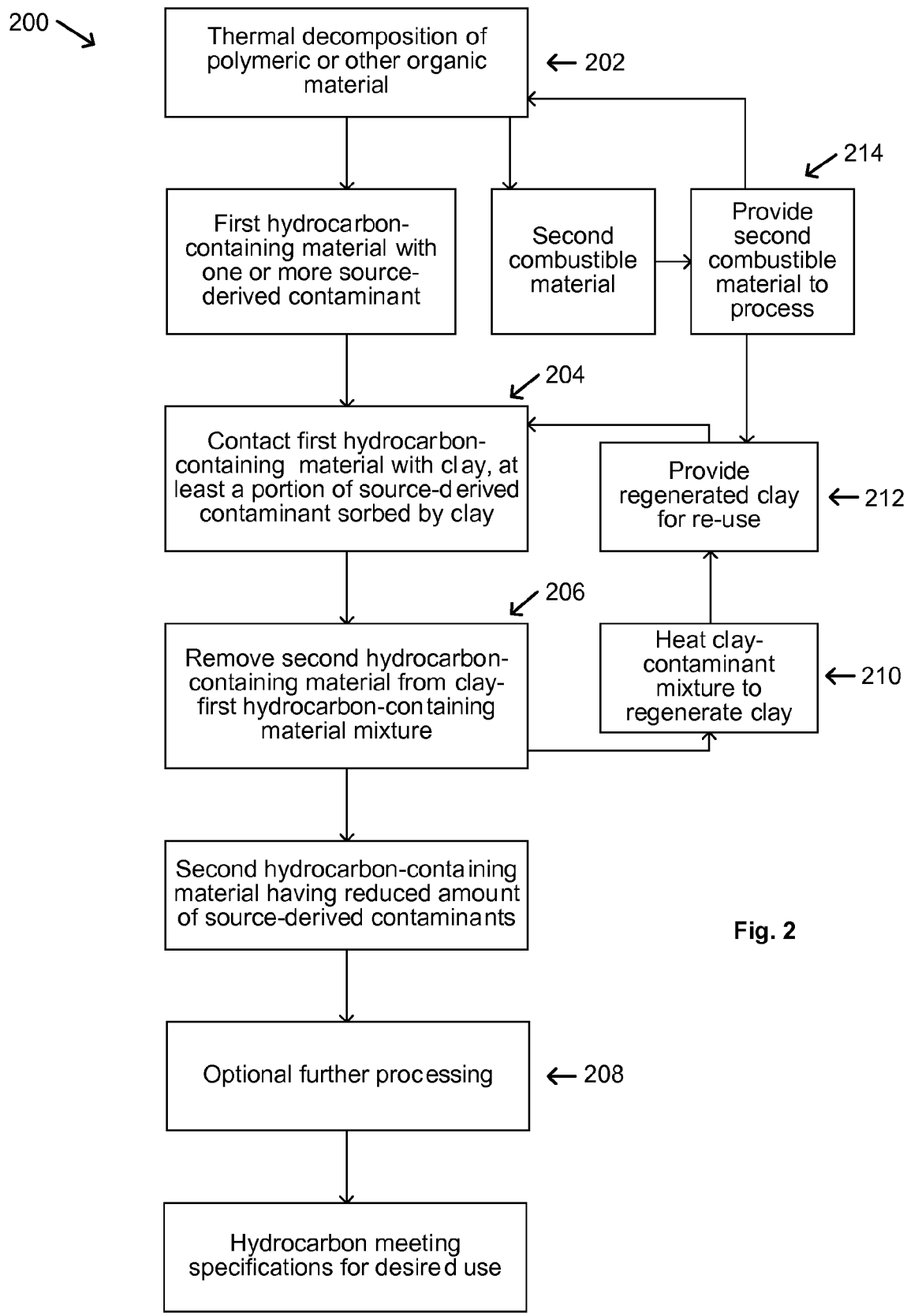
FIG. 2 is a schematic process flow diagram of a second embodiment of a process in accordance with the present invention.

FIG. 2 is a schematic flow diagram illustrating a process 200 in accordance with this embodiment of the present invention. It is noted that FIG. 2 refers to a "source-derived contaminant" which, as noted above, is a general term including the polymer-derived contaminants referred to in the following description of an embodiment in accordance with the present invention. The following description is thus not limited to polymeric materials and polymer-derived contaminants.

The first step of this embodiment, shown in FIG. 2 as step 202, includes (a) thermally decomposing a polymeric material. The material is most often a mixture of polymeric materials which have been recycled, and in particular the polymeric materials may be thermoplastic or thermosetting polymeric materials and are often organic polymers. Such polymeric materials generally include a variety of different polymers, such as polyethylene, polypropylene, polyvinyl chloride (PVC), polyethylene terephthalate (PET), nylons, polyvinylidene chloride, tetrafluoroethylene, ABS, styrenics, polybutadienes, natural and synthetic rubbers, etc. Although this embodiment is described with respect to and in terms of polymeric materials and polymer-derived contaminants, it is to be understood to be equally applicable to other organic materials, as defined above, which have been recycled, and to the source-derived contaminants associated with such other organic materials.

The step (a), thermally decomposing the polymeric materials to yield a first hydrocarbon-containing material, shown in FIG. 2 as step 202, may be carried out by any method known in the art. The present invention is not limited to any particular process for converting recycled polymeric materials into a hydrocarbon-containing material. In general, such processes include thermal decomposition of the polymeric materials in an atmosphere from which oxygen and other reactive materials are excluded and recovery of hydrocarbon-containing materials.

In one embodiment, in (a) the polymeric material is thermally decomposed at a temperature from about 200° C. to about 750° C., and in another embodiment, in (a) the polymeric material is thermally decomposed at a temperature from about 300° C. to about 600° C., and in another embodiment, from about 350° C. to about 500° C.

Here, as elsewhere in the specification and claims, the numerical limits of the specifically disclosed range and ratio limits may be combined. Thus, for example, although a range of about 200° C. to about 500° C. is not specifically stated, it is included within the scope of the foregoing disclosure, as is a range of about 300° C. to about 750° C. Furthermore, numerical values within the specifically disclosed ranges are included within the disclosure. Thus, for example, specific temperatures of about 350° C. and about 650° C., although not specifically stated, are included within the scope of the foregoing disclosure.

In one embodiment, decomposing the polymeric materials may be carried out by extracting hydrocarbons from polymeric materials, including steps of liquefying the polymeric materials to obtain liquids, heating the liquids in a process chamber until gaseous hydrocarbon-containing materials are vaporized from the liquids and removing and condensing, thereby yielding the hydrocarbon-containing material. The hydrocarbon-containing material thus obtained includes one or more source-derived contaminant which detracts from the value of the hydrocarbon-containing material. Such processes may be carried out at reduced, increased or at substantially atmospheric pressures.

In other embodiments, decomposing the polymeric materials may be carried out by any known method such as, for example, the methods disclosed in U.S. Pat. Nos. 4,851,601, 5,608,136, 5,811,606, 5,824,193 and 6,534,689, among others. The disclosures of these patents are incorporated herein by reference for their teachings relating to the decomposition of polymeric materials into hydrocarbon-containing materials, in which the hydrocarbon-containing materials include one or more polymer-derived contaminants.

In one exemplary embodiment, the first hydrocarbon-containing material has a flash point which is both below the minimum flash point generally required for diesel-grade fuel, about 52° C., and above the flash point for gasoline, about −40° C. In one embodiment, the first hydrocarbon has a flash point of about 25° C., and in another embodiment, the first hydrocarbon has a flash point in the range from about 25° C. to about 35° C. The flash point of the first hydrocarbon-containing material may vary from this range, depending on the amount of light ends produced by the thermal decomposition of the polymeric materials, and on the amount of such materials which are included in the first hydrocarbon-containing material. In some recycling systems, the light ends are separated, e.g., by not condensing, cycled to the process apparatus and used for fuel for the thermal decomposition.

As noted above, the first hydrocarbon-containing material thus obtained includes one or more source-derived contaminant. As will be recognized, there may be and usually are a plurality of source-derived contaminants in the hydrocarbon-containing material. These contaminants may include, for example, oxygen compounds, chlorine, chloride, chlorine compounds, sulfur, sulfur compounds, nitrogen compounds, carbon or asphalt-like materials, metals, metal compounds and other inorganic materials, dark color, cloudiness, offensive and undesirable odors which may include "non-hydrocarbon odors", i.e., odors which are not characteristic of hydrocarbons and so which are undesirable when displayed by hydrocarbon-containing materials. With respect to chlorine, chlorine has a number of different oxidation states, and may be present in a number of different forms. The most usual form of chlorine in the contaminants of the hydrocarbon-containing material is chloride.

Once the first hydrocarbon-containing material, which contains one or more polymer-derived contaminant, has been obtained, (a) is complete and the next step of the process, (b) is carried out. Step (b) is shown schematically as step 204 in FIG. 2. In (b), the first hydrocarbon-containing material is contacted with a clay material to form a clay-hydrocarbon mixture in which at least a portion of the one or more polymer-derived contaminant becomes associated with the clay to form a clay-contaminant mixture, that is, to be sorbed by the clay. The contacting of the first hydrocarbon-containing material with the clay material may be carried out in a number of ways, as generally described above.

The contacting should be thorough and intimate, so that the clay, in finely divided form, is fully contacted with the first hydrocarbon-containing material. By such contacting, a maximum quantity of the one or more polymer-derived contaminants becomes associated with or sorbed by the clay. As will be recognized, many of the source- or polymer-derived contaminants are materials which have a greater affinity for the clay than for the hydrocarbons in the first hydrocarbon-containing material. Thus, in one embodiment, the clay acts to sorb, trap and hold or sequester, the one or more source- or polymer-derived contaminant.

The amount of clay used per volume of the first hydrocarbon-containing material depends on a number of factors, including for example, the loading or amount of the polymer-derived contaminant in the first hydrocarbon-containing material, the extent of reduction of the amount sought from the process, and the standards or specifications which the removed hydrocarbon-containing material should meet, among others. In addition, the amount may depend on whether a batch-type or continuous-type process is carried out.

In one embodiment, for a batch process, the quantity of clay material may range from about 0.1 to about 2 pounds of clay per gallon of the first hydrocarbon-containing material, and in one embodiment, from about 0.2 to about 1 pound of clay per gallon. In such a batch-type process, the clay material is mixed with the hydrocarbon-containing material, heated to a temperature from about 200° F. to about 700° F., and in one embodiment, from about 300° F. to about 500° F. in a closed container from which oxygen has been removed and/or is excluded, for a time ranging from about 5 minutes to about 3 hours, and in one embodiment, from about 15 minutes to about 1 hour. During this time the clay and the first hydrocarbon-containing material are thoroughly mixed together, so that at least a portion, and preferably a large portion, of the source-derived contaminants in the first hydrocarbon-containing material can be sorbed onto the clay. Thereafter, the clay material and the first hydrocarbon-containing material are filtered, so that hydrocarbon material including a reduced amount of the source-derived contaminants can be removed from the process.

In one embodiment, the treatment of the first hydrocarbon-containing material with the clay material is carried out at a temperature in the range from about 50° C. to about 180° C., and in one embodiment, from about 60° C. to about 140° C., and in another embodiment, from about 80° C. to about 120° C.

In one embodiment, the treatment of the first hydrocarbon-containing material with the clay material is carried out at a pressure ranging from substantially atmospheric pressure to a pressure of several hundred pounds per square inch (psi). In one embodiment, the pressure is in a range from about 15 psi to about 1500 psi (about 1 to about 100 kg/cm$^2$), and in one embodiment, from about 30 psi to about 1000 psi (about 2 to about 70 kg/cm$^2$).

In one embodiment, the clay material includes one or more of acidified or acid-treated clay, fuller's earth, montmorillonite clay, attapulgus clay, decolorizing clay, bleaching clay, bentonite, kaolin clay. Clays believed to be commercially available and useful herein include, for example, FILTROL®, TONSIL®, RETROL®, ROCKSIL™ and Pembina clays.

The clay material may be provided in any suitable particle size. In one embodiment, the clay material is provided in a mesh size ranging from about 50 mesh to about 400 mesh (particle size ranging from about 300 microns to about 37 microns), and in one embodiment, from about 100 mesh to about 300 mesh (about 149 microns to about 44 microns), and in one embodiment from 150 mesh to about 200 mesh (about 100 microns to about 74 microns). As will be recognized by those in the art, using smaller particle sizes results in more effective contacting of the first hydrocarbon-containing material and its source-derived contaminants with the clay, while on the other hand, using larger particle sizes facilitates filtration. Thus, in use the particle size may be optimized to attain the desired source-derived contaminant removal and filtration rates.

The mixing of the clay material with the first hydrocarbon-containing material may be carried out either in a batch process or in a continuous process. As will be recognized, a continuous process has a number of advantages, but also requires more sophisticated equipment. Both batch and continuous processes are briefly described in the following.

In a batch process, the quantity of clay added to the first hydrocarbon-containing material may range from about 1 wt % to about 20 wt %, and in one embodiment, from about 5 wt % to about 10 wt % based on the weight of the first hydrocarbon containing material to be contacted. The quantity of clay may be adjusted as needed based on the estimated loading of source-derived contaminants in the first hydrocarbon-containing material. As will be understood, the minimum quantity of clay required should be used, in order to reduce filtration time and to reduce the amount of clay used, which must be either recycled or discarded.

The processing may be carried out at elevated temperatures as disclosed above, in one embodiment in a closed container. As will be understood, the closed container is suggested for safety reasons (to avoid exposure to the atmosphere and possible ignition sources) and for environmental/aesthetic reasons (due to the noxious or undesirable odor which may be present in the hydrocarbon-containing material). Suitable mixing may be employed, such as stirring, sparging with inert gas, In the batch process, when the clay material and the first hydrocarbon-containing material have been thoroughly mixed, and source-derived contaminants have become associated with the clay to form a clay-contaminant mixture, the next step in the process is carried out, i.e., step (c), filtering the clay-hydrocarbon mixture to remove therefrom the clay-contaminant mixture and a second hydrocarbon-containing material have a reduced content of the source-derived contaminant.

Step (c) of the process of this embodiment is schematically shown in FIG. 2 as step 206. In this step 206, the clay-contaminant mixture is filtered out, leaving a second hydrocarbon containing material with at least a reduced proportion of the one or more source- or polymer-derived contaminant. In one embodiment, the second hydrocarbon-containing material has a reduced amount of the source- or polymer-derived contaminant. In one embodiment, substantially all of the one or more polymer-derived or source-derived contaminant is removed. The filtration may be carried out by any known means of contacting a liquid with a solid filter media. In general, the filtration will be carried out by pumping the clay-hydrocarbon mixture, which contains also the clay-contaminant mixture, through suitable filter media which will remove the clay-contaminant mixture and allow the second hydrocarbon-containing material to pass through for subsequent collection. In one embodiment, in carrying out this step (c), the mixture may be allowed to stand, thereby to allow the particulate matter to at least partially settle.

In a continuous process, the steps (b) and (c) (steps 204 and 206 in FIG. 2), contacting and removing, may be combined as described in the following. Thus, in one embodiment of the continuous process, the clay particles are packed into a column, for example a cylindrical pipe, tube or elongated pressure vessel, and the first hydrocarbon-containing material is then passed through the column under pressure. Pressures may be in the ranges disclosed above, or higher, if needed to force the hydrocarbon-containing material through the packed column. The column is of a suitable size to allow a selected volume of the first hydrocarbon-containing material to be passed through the column before the clay material has to be regenerated. As will be understood, the efficiency of contaminant removal is increased the longer the column and the more tortuous the path taken by the hydrocarbon-containing material passing through the column. However, making the column excessively long relative to its diameter contributes to pressure loss between the inlet and outlet of the column, which reduces the rate at which the hydrocarbon-containing material can be passed through the column. On the other hand, an overly large diameter column increases the quantity of clay which must be used and also increases the volume of hydrocarbon retained in the dead volume of the column. Selection of the column dimensions is within the knowledge of those of ordinary skill in the art.

In this continuous embodiment, the first hydrocarbon-containing material is passed through the column continuously, pumping the hydrocarbon-containing material with its load of the one or more polymer-derived or source-derived contaminant into the upstream end and removing the cleaned, second hydrocarbon-containing material from the downstream end, with a substantial proportion of the polymer-derived or source-derived contaminants being captured by the clay in the column. The process may be continued until the clay becomes saturated with the contaminant(s) and the product emerging from the downstream end no longer meets the needs of the user (i.e., the product no longer meets pre-established criteria), at which time the flow may be switched to another column, and/or temporarily stopped, and the saturated clay material is regenerated and recycled for reuse or replaced. As discussed below, the clay material may be regenerated a plurality of times. When the clay is finally exhausted after the plurality of regeneration/reuse cycles, it may be replaced.

Although not necessary to the invention, as will be recognized as an enhancement of efficiency of operation, in one embodiment of the continuous process, a plurality of columns may be set up in parallel arrangement. The parallel arrangement may include a manifold including valves and connections to the plurality of columns, so that the flow of the first hydrocarbon-containing material may be easily and quickly switched from one column to another. In this embodiment, as soon as one column becomes saturated with the one or more source-derived contaminant and the effluent from the column no longer meets the needs of the user, settings on the manifold are changed to divert the flow of the hydrocarbon-containing material to another column containing new or regenerated clay material. Meanwhile, the clay material in the first column may be regenerated. If the exchange requires a long time relative to the time required to saturate the column with the one or more source-derived contaminant, or if a back-up column is desired, more than two columns may be arranged in parallel, allowing a continuous process to be carried out smoothly and with substantially no interruption.

In one embodiment, a plurality, for example 12, filter columns may be set up in a single line, with the flow of the first hydrocarbon-containing material being alternately fed to each column. As the clay in each column becomes saturated with the contaminant(s) from the first hydrocarbon-containing material, the flow is switched to the next available column of the plurality. In order to increase capacity without complexity, a plurality of lines may be set up, each with a plurality of filter columns.

In one embodiment, the apparatus used in carrying out the process of the present invention is the ECOIL system, available from Filtervac International, Inc., Breslau, Ontario, Canada. The ECOIL system is designed to regenerate transformer oils. The present inventor has discovered that the ECOIL system can be adapted for use in the present invention, as described herein.

The reduction of source-derived contaminants of course depends on the relative quantities of clay and of the first hydrocarbon-containing material. In one embodiment, the source-derived contaminant levels are reduced by greater than about 90%, in another embodiment, by greater than 95% and in yet another embodiment, by greater than 98%.

Specifically, in one embodiment, the loading of chloride in the first hydrocarbon-containing material may range from about 100 ppm up to about 5000 ppm, and in one embodiment the second hydrocarbon-containing material made by this process and suitable for use as a fuel, the chloride content ranges from about 1 ppm to about 50 ppm. Since chloride is not a normally occurring contaminant in refined hydrocarbons, there is no specification for chloride content in hydrocarbons used as fuels. However, in order to avoid oxidation and corrosion of fuel supply parts, engine parts and exhaust system parts and environmental pollution, the chloride content should be as low as possible.

With respect to sulfur, for refinery-grade diesel, the ASTM specification D975 "Standard Specification for Diesel Fuel Oils" allows a maximum sulfur content of 0.05% for standard, on-road fuel use, and a maximum sulfur content of 0.5% for off-road use (e.g., heavy construction equipment). The sulfur content is measured according to ASTM D2622. In one embodiment, the loading of sulfur and sulfur compounds in the first hydrocarbon-containing material may range from about 1% to about 5%. The process of the present invention, in one embodiment, reduces the sulfur content (both as elemental sulfur and as sulfur compounds) of the second hydrocarbon-containing material to a level which meets the ASTM standard for diesel fuel, that is, to a sulfur content less than 0.05%.

With respect to odor, although there are no specific standards, as will be understood, when a hydrocarbon proposed for use as diesel fuel has a highly disagreeable odor, no one wants to use it, and the exhaust it generates may fail to meet environmental standards. Furthermore, to the extent possible, a hydrocarbon proposed for use as diesel or other fuel should smell appropriately, or at least like a hydrocarbon. Although there are no currently available devices or tests capable of determining when an odor is acceptable or unacceptable, the present invention is capable of removing a substantial portion of any disagreeable odor in the first hydrocarbon-containing material. Thus, in one embodiment, the present invention removes any disagreeable, unacceptable odor in the first hydrocarbon-containing material, and yields a product that smells like a hydrocarbon, i.e., has a hydrocarbon-like odor.

With respect to color, as is known, a number of source-derived contaminants contribute to the overall color of a hydrocarbon-containing material.

Particulate matter in the first hydrocarbon-containing material contributes to both the color and the clarity or lack thereof. Particles of about 0.05 micron and smaller adhere to the clay.

In one embodiment, acidic clays may be utilized in the present invention. The acidic clays which may be utilized in the invention are typically illustrated by montmorillonite clay. In one embodiment, such clay includes a substantial base exchange capacity. Various acidic clays are available in commerce and may be used such as montmorillonite, attapulgite, commercial zeolites and the like. In one embodiment, such clays contain a base exchange capacity of at least about 15 milliequivalents of exchangeable ion per 100 grams of clay.

In one embodiment, the process in accordance with the present invention does not include cracking of hydrocarbons obtained from the process of the present invention. In general, the process provides suitable hydrocarbon materials without need for cracking, which is expensive both in terms of capital and operating expenses.

In one embodiment, the process in accordance with the present invention does not include any separate step to remove chlorine. In one embodiment, the process does not include additional or separate steps to remove any contaminant. In general, the process provides suitable hydrocarbon materials without need for additional steps directed to removing specific contaminants, which may be expensive both in terms of capital and operating expenses.

In one embodiment, the process in accordance with the present invention does not include use of any catalysts. In general, the process provides suitable hydrocarbon materials without need for catalysts, which may be expensive both in terms of capital and operating expenses, as well as requiring removal of the catalyst.

In one embodiment, the process in accordance with the present invention does not include fractionating of the hydrocarbons obtained from the process of the present invention. In general, the process provides suitable hydrocarbon materials without need for fractionation, which is expensive both in terms of capital and operating expenses.

In one embodiment, as shown in FIG. 2, the process further includes further processing. In one embodiment, the further processing includes (e) blending the second hydrocarbon with another hydrocarbon material to provide a refinery-grade fuel. Step (e) is shown in FIG. 2 as step 208. Although the second hydrocarbon obtained from the process of the present invention is generally similar to a fuel, and in some embodiments meets all of the standards for a refinery-grade fuel, in one embodiment, the second hydrocarbon has a flash point below the ASTM specified diesel flash point of 52° C.

In one embodiment, the another hydrocarbon material may be a recycled hydrocarbon material, for example, a recycled lubricating oil, gear oil, hydraulic oil or any other petroleum-derived or synthetic hydrocarbon material.

In one embodiment, the second hydrocarbon has a flash point below specification for diesel-grade fuel, the another hydrocarbon material has a flash point above specification for diesel-grade fuel, and the diesel-grade fuel made by blending the second hydrocarbon-containing material with the another hydrocarbon-containing material has a flash point within specification for diesel-grade fuel.

In one embodiment, following the filtering (c) during which the second hydrocarbon-containing material is removed from the clay-contaminant mixture, as shown in FIG. 2 as step 210, the process further includes (d) heating the clay-contaminant mixture to remove the contaminants and to regenerate the clay for further use in the process of the present invention. In one embodiment, the clay-contaminant mixture is heated to a temperature in the range from about 400° C. to about 815° C. to regenerate the clay material. In one embodiment, the clay-contaminant mixture is first heated to a temperature in a range from about 350° C. to about 425° C., and thereafter the temperature is ramped up to about 815° C. In one embodiment, in step 210 the clay is heated in (d) without removing the clay from the column, i.e., while the clay remains packed in the column. This embodiment is further discussed below.

As shown schematically in FIG. 2, in one embodiment, the reclaimed clay material from (d), shown as step 212 in FIG. 2, is provided to and is used in (b), shown as step 204 in FIG. 2. Thus, the clay used to filter out the source-derived contaminants can be regenerated and recycled for multiple further cycling in the process of the present invention. In one embodiment, the clay can be regenerated and reused up to at least 300 times, and in another embodiment, up to at least 500 times, before the clay becomes so heavily loaded with contaminants that cannot be removed in the thermal regeneration process that it must be discarded and replaced. The present inventor has discovered that the clay actually works better after it has been through one or more regeneration cycle. As will be understood, when the clay is not removed from the column for the regeneration, the re-use may involve little more than changing the feed of the hydrocarbon material to the column containing the newly regenerated clay.

In one embodiment, as shown in FIG. 2, a second combustible material is obtained from the thermal decomposition step 202. In one embodiment, shown in FIG. 2 as step 214, the second combustible material is provided to other parts of the process for combustion as a source of heat. In one embodiment, the second combustible material may include, for example, gaseous by-products of the thermal decomposition or low-boiling by-products. Such by-products may include such hydrocarbons as methane, ethane, propane, butane, pentane, and isomers and mixtures thereof. The quality, mixture and/or the quantity of such by-products may make it uneconomical to recover and separate the various elements of the second combustible material. Thus, the use of these materials for providing heat to the process provides an excellent way to dispose of these materials while at the same time deriving a valuable benefit from them. In some embodiments, the second combustible material may comprise undesirable contaminants which would interfere with or prevent the re-use of such material in other ways than the above-described internal recycling.

In another embodiment, the present invention relates to a continuously operating process for producing hydrocarbons from a polymeric material, similar to the foregoing methods, including steps of:

(a) thermally decomposing a polymeric material to obtain a first hydrocarbon-containing material including one or more polymer-derived contaminant (illustrated in FIG. 2 as step 202);

(b) contacting the first hydrocarbon-containing material with a clay material in a filter apparatus, at least a portion of the one or more polymer-derived contaminant being sorbed by the clay to form a clay-contaminant adduct (illustrated in FIG. 2 as step 204);

(c) separating a second hydrocarbon-containing material from the filter apparatus, in which the second hydrocarbon-containing material comprises a reduced amount of the polymer-derived contaminant (illustrated in FIG. 2 as step 206);

(d) heating the clay material and the clay-contaminant adduct to an elevated temperature to regenerate the clay material (illustrated in FIG. 2 as step 210); and (e) repeating (a)-(d), including providing the clay material from (d) to (b) (illustrated in FIG. 2 as step 212).

This process can be operated on a continuous basis. In one embodiment, the step (c) is carried out in a plurality of filtering mechanisms, so that when the absorption capacity of one filter mechanism is exhausted, the product flow can be diverted to another filtering mechanism while the one filter mechanism is recycled for further use. The recycling for further use may include any of the above-described treatments, including in particular, a thermal treatment of the clay-contaminant mixture to remove the polymer-derived contaminants from the clay material. In one embodiment, in (d) the clay-contaminant mixture is heated to a temperature in a range from about 400° C. to about 815° C. to regenerate the clay material.

In one embodiment, in addition to the first, low-grade hydrocarbon, (a) yields a second combustible material, as shown in FIG. 2. In one embodiment, the second combustible material is provided to at least one of (a) and (d) for combustion for providing heat for the respective thermally decomposing and for the thermally treating, which is illustrated in FIG. 2 as step 214.

Figure 3:
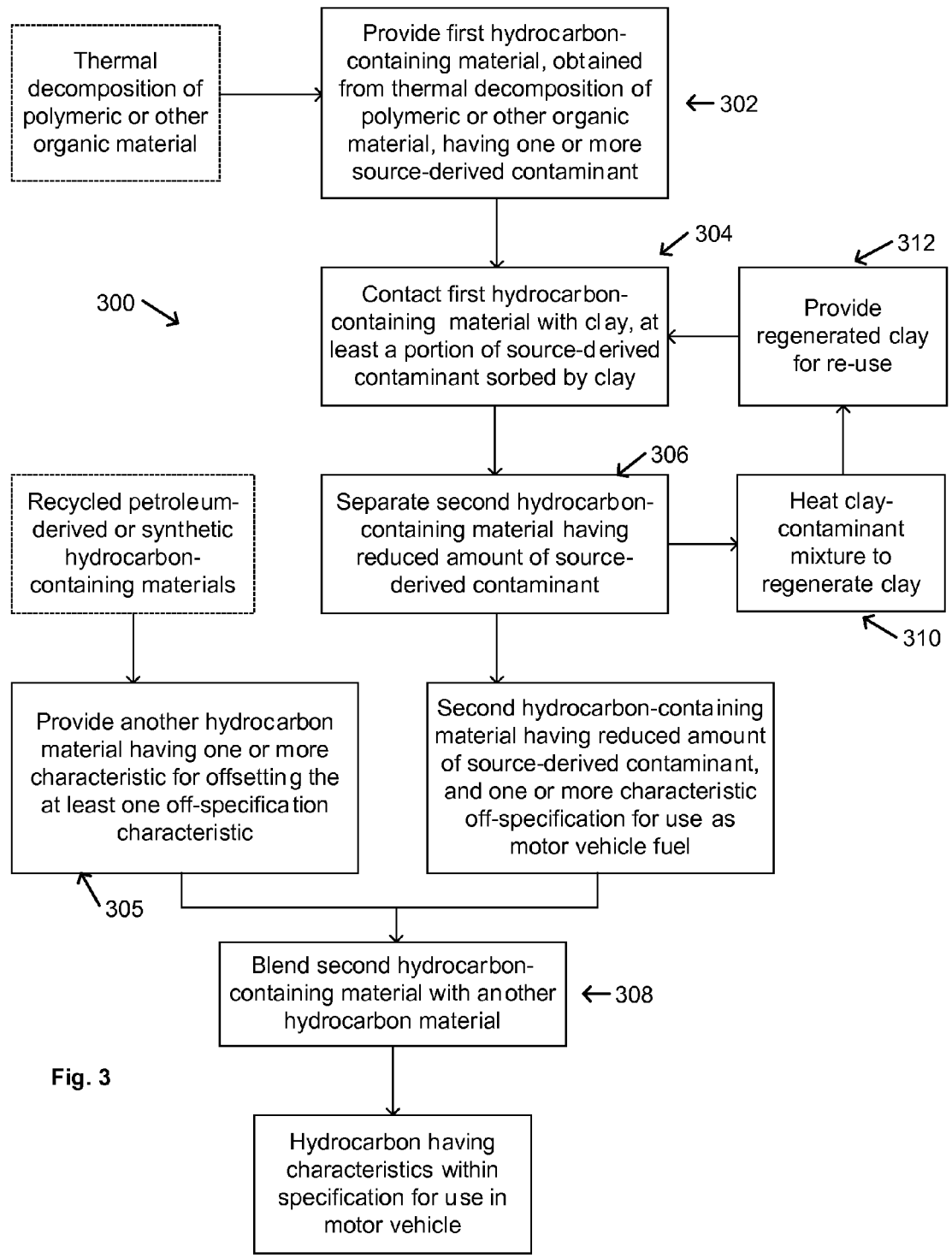
FIG. 3 is a schematic process flow diagram of a third embodiment of a process in accordance with the present invention.

In another embodiment, illustrated schematically in FIG. 3 as the process 300, the present invention further relates to a process for providing a hydrocarbon-containing material suitable for use in a motor vehicle from a recycled polymeric or other organic material, including steps of:

(a) providing a first hydrocarbon-containing material obtained from thermal decomposition of a recycled polymeric or other organic material, the first hydrocarbon-containing material including one or more source-derived contaminant (illustrated in FIG. 3 as step 302);

(b) contacting the first hydrocarbon-containing material with a clay material to form a clay-hydrocarbon-containing material mixture, whereby at least a portion of the source-derived contaminant is sorbed by the clay material to form a clay contaminant adduct (illustrated in FIG. 3 as step 304);

(c) separating a second hydrocarbon-containing material from the mixture, in which the second hydrocarbon-containing material contains a reduced amount of the source-derived contaminant, and in which the second hydrocarbon-containing material has one or more off-specification characteristic relating to use in a motor vehicle (illustrated in FIG. 3 as step 306);

(e) providing another hydrocarbon material, in which the another hydrocarbon material has one or more characteristic for offsetting the one or more off-specification characteristic of the second hydrocarbon-containing material (illustrated in FIG. 3 as step 305); and (f) blending the second hydrocarbon-containing material with the another hydrocarbon to obtain a hydrocarbon in which the one or more characteristic is within specification for use in a motor vehicle (illustrated in FIG. 3 as step 308). In one embodiment, the use in a motor vehicle is as one or more of a motor vehicle fuel, a lubricant, a hydraulic fluid, and a solvent.

This process can be operated on a continuous basis, in one embodiment of which the process further comprises (g) repeating steps (a)-(f).

In this embodiment of the invention, the foregoing steps (a), (b), (c), and the step (d) mentioned below, are carried out in substantially the same manner as described above with respect to the embodiments of FIGS. 1 and 2, so will not be described in detail here.

Step (e), providing another hydrocarbon material, may be carried out using any appropriate hydrocarbon material. In one embodiment, the step (e) provides a recycled hydrocarbon material, obtained from recycling of petroleum-derived oils such as lubricating oils, cutting oils, engine oils, solvents and other known sources of hydrocarbon-containing materials which may be recycled. In one embodiment, the another hydrocarbon-containing material has been treated in a process such as that described herein. In other embodiments, it has been treated by other known methods for recycling such materials.

In one embodiment, the another hydrocarbon-containing material is a recycled material as described above which has not yet been treated by any recycling process. Rather, in this embodiment, the "dirty" recycled hydrocarbon-containing material (e.g., engine oil, etc. as described above) is blended with the first hydrocarbon-containing material, and the blended "dirty" hydrocarbon-containing material is contacted with the clay material as described herein. Thus, in this embodiment, the present process is used to treat together in a single process, both the first hydrocarbon-containing material which has been obtained from thermal decomposition of polymeric or other organic material and the recycled hydrocarbon-containing material which has been obtained from any source such as engine oil, etc. The blending amounts may be determined by those of skill in the art based upon the properties of the recycled materials, both the polymeric or other organic material and the recycled hydrocarbon-containing material.

A multitude of processes for recycling such hydrocarbon-containing materials are known in the art, and the product of any of these known processes potentially may be used in this step, depending of course on the exact characteristics of the recycled material and the relationship of such characteristics to the characteristics of the hydrocarbon-containing material obtained from recycling of polymeric or other organic material in accordance with the present invention.

In one embodiment, step (e) may comprise use of virgin, newly refined hydrocarbon-containing material. It is recognized that use of virgin, newly refined hydrocarbon-containing material may not be cost effective on a large scale, it may be necessary or useful to use some amount of such oil to obtain the desired characteristics, or to bring certain characteristics into conformance with a particular specification.

Step (f), blending the second hydrocarbon-containing material with the another hydrocarbon material, illustrated as the step 308 in FIG. 3, may be carried out as needed to adjust the one or more characteristic which is off or outside of specification for use as a motor vehicle fuel. Thus, for example, as described above, if the flash point of the second hydrocarbon-containing material is below specification for diesel fuel, and the flash point of the another hydrocarbon material is above specification for diesel fuel, the two materials may be blended at an appropriate ratio to obtain a hydrocarbon material meeting the flash point specification for diesel fuel. As will be recognized, if more than one characteristic is out of specification, it may be necessary to blend more than one another hydrocarbon material with the second hydrocarbon-containing material to obtain a hydrocarbon material having characteristics meeting all the specifications for diesel fuel or any other particular desired use. Such adjustments are well within the capability of those of skill in the art of blending hydrocarbon materials for specific desired uses.

In one embodiment, the step (c) is carried out in a filtering mechanism, such as a column or tubular apparatus packed with the clay material. In one embodiment, the step (c) is carried out in a plurality of such filtering mechanisms, so that when the absorption capacity of one filtering mechanism is exhausted, the product flow can be diverted to another filtering mechanism while the one filter mechanism is recycled for further use. The recycling for further use may include any of the above-described treatments, including in particular, (d) a thermal treatment of the clay-contaminant mixture to remove the contaminants from the clay material (illustrated in FIG. 3 as step 310). In one embodiment, in (d) the clay-contaminant mixture is heated to a temperature in a range from about 400° C. to about 815° C., to regenerate the clay material. In one embodiment, in step 310 the clay is heated in (d) without removing the clay from the column, i.e., while the clay remains packed in the column. This embodiment is further discussed below. In one embodiment, the regenerated clay material from (d) is recycled for use in the step 304, as illustrated in step 312 in FIG. 3. As will be understood, when the clay is not removed from the column for the regeneration, the re-use may involve little more than changing the feed of the hydrocarbon material to the column containing the newly regenerated clay.

In one embodiment, the another hydrocarbon provided in step (f) is obtained from an on-site source, or from a storage container having a supply from another recycling facility which handles, e.g., recycled petroleum-derived or synthetic hydrocarbon materials. In FIG. 3, the source of the another recycled hydrocarbon-containing material provided in step 305 is shown in a dotted-line (phantom) box, to indicate this step may be carried out in a wholly separate operation, or may be provided from an outside source, or may be carried out at the same location as part of an integrated process with the process of the present invention. As described herein, in some embodiments of the present invention this step is part of the inventive process, and in other embodiments, it may be carried out by others.

Similarly, in the process illustrated in FIG. 3, the step of thermal decomposition of the polymeric or other organic material is shown in a dotted-line (phantom) box, to indicate this step may be carried out in a wholly separate operation, or may be provided from an outside source, or may be carried out at the same location as part of an integrated process with the process of the present invention. As described herein, in some embodiments of the present invention this step is part of the inventive process, and in other embodiments, it may be carried out by others.

Although not shown in FIG. 3, the process of the embodiment illustrated in FIG. 3 may include a step analogous to the step 214 in FIG. 2, in which a second combustible material is obtained from the thermal decomposition of the polymeric or other organic material, and is provided to the process as a heat source for the steps in which heat is required.

The process in accordance with any embodiment of the invention can be applied to obtain materials other than a fuel for a motor vehicle, such as any known use for hydrocarbon materials, including for example, as a fuel for industrial uses, ships, locomotives, heat, electricity, steam or other power generation, and for such uses as fuel for an oil lamp, as a lubricant in various applications, as a hydraulic fluid, or other uses such as a solvent or cutting oil. In each of these desired uses, certain specifications are applicable to various characteristics of the material. The characteristics may include such variables as boiling range, flash point, viscosity, API gravity, etc. It is likely that a given hydrocarbon-containing material obtained from recycled materials such as those disclosed herein will have one or more characteristic.

Thus, in one embodiment, the present invention relates to a process for producing a hydrocarbon suitable for a desired use from a recycled polymeric or other organic material, including:

(a) providing a first hydrocarbon-containing material obtained from thermal decomposition of a recycled polymeric or other organic material, the hydrocarbon-containing material including one or more source-derived contaminant (similar to step 202 in FIG. 2 and step 302 in FIG. 3);

(b) contacting the first hydrocarbon-containing material with a clay material in a filter apparatus, at least part of the source-derived contaminant being sorbed by the clay material to form a clay-contaminant adduct (similar to step 204 in FIG. 2 and step 304 in FIG. 3);

(c) removing a second hydrocarbon-containing material from the filter apparatus, in which the second hydrocarbon-containing material comprises a reduced amount of the source-derived contaminant, in which the hydrocarbon-containing material has one or more characteristic requiring adjustment for a desired use (similar to step 206 in FIG. 2 and step 306 in FIG. 3);

(e) providing another hydrocarbon material, in which the another hydrocarbon material has one or more characteristic for offsetting the one or more characteristic requiring adjustment (similar to step 305 in FIG. 3); and (f) blending the second hydrocarbon-containing material with the another hydrocarbon to obtain a blended hydrocarbon fuel in which each of the one or more characteristic is within specification for the desired use (similar to step 308 in FIG. 3).

In one embodiment, the process further includes (d) heating the clay and the clay-contaminant adduct to a temperature in a range from about 400° C. to about 815° C. to regenerate the clay material (similar to step 210 in FIG. 2 and step 310 in FIG. 3), and providing the regenerated clay material to (b) (similar to step 212 in FIG. 2 and step 312 in FIG. 3).

In one embodiment, the process is operated on a continuous basis and includes (g) repeating steps (a)-(f).

Figure 4:
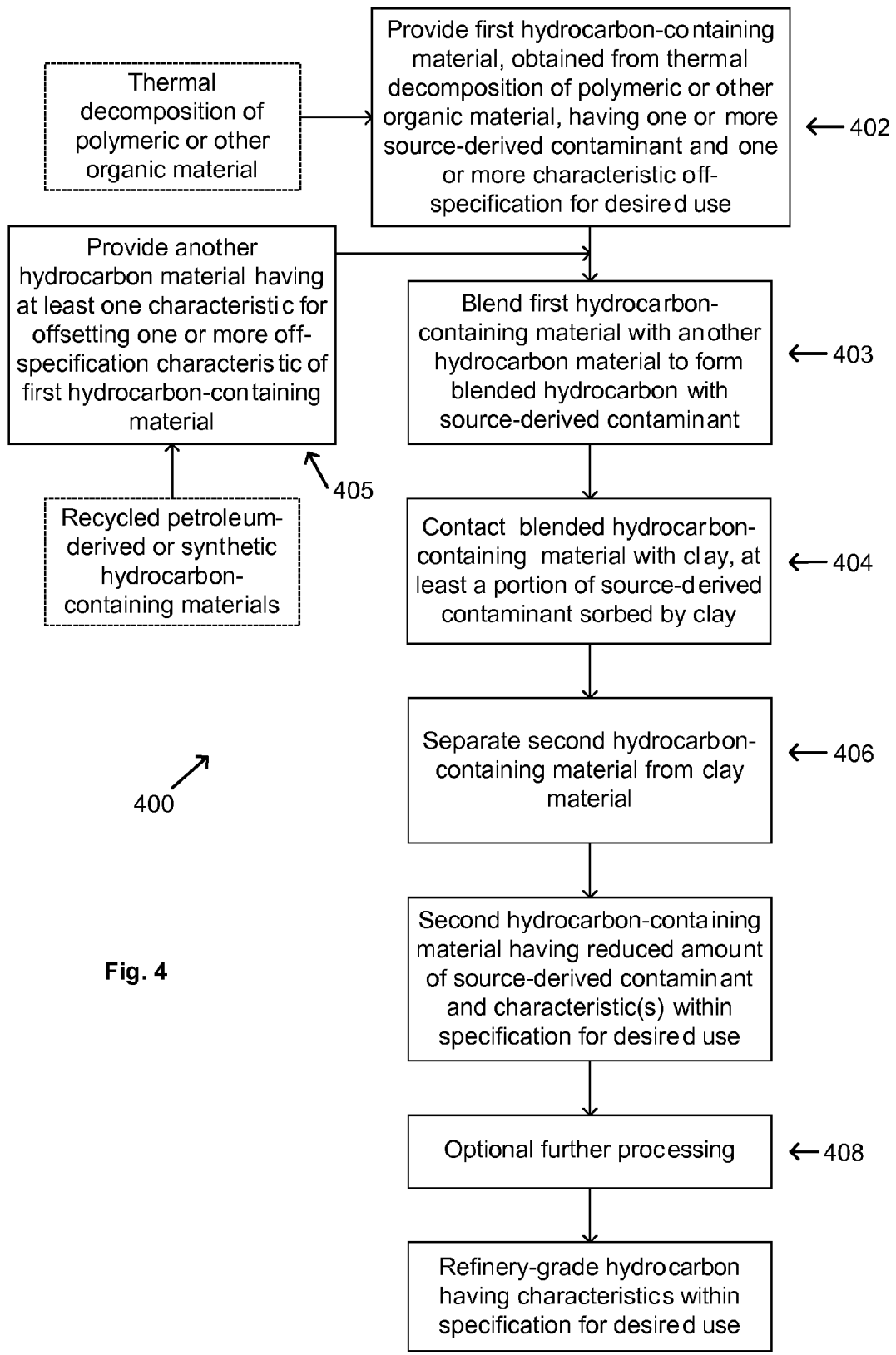
FIG. 4 is a schematic process flow diagram of a fourth embodiment of a process in accordance with the present invention.

As noted, in one embodiment, the steps of (e) and (f) are carried out prior to step (b), so that the another hydrocarbon is blended with the first hydrocarbon-containing material rather than with the second hydrocarbon-containing material. FIG. 4 is a schematic process flow diagram of a fourth embodiment of a process in accordance with the present invention, illustrating an embodiment in which steps (e) and (f) precede step (b). Thus, in this embodiment, as shown in FIG. 4, the process 400 for producing a hydrocarbon suitable for a desired use from a recycled polymeric or other organic material, includes (a) providing a first hydrocarbon-containing material obtained from thermal decomposition of a recycled polymeric or other organic material, wherein the first hydrocarbon-containing material comprises one or more source-derived contaminant and has one or more characteristic requiring adjustment for a desired use (as shown in step 402 of FIG. 4);

(e) providing another hydrocarbon material, wherein the another hydrocarbon material has one or more characteristic for offsetting the one or more characteristic requiring adjustment (as shown in step 405 of FIG. 4);

(f) blending the first hydrocarbon-containing material with the another hydrocarbon to obtain a blended hydrocarbon-containing material wherein the one or more characteristic is within specification for the desired use (as shown in step 403 of FIG. 4);

(b) contacting the blended hydrocarbon-containing material with a clay material to form a clay-hydrocarbon-containing mixture, whereby at least a portion of the source-derived contaminant is sorbed by the clay material (as shown in step 404 of FIG. 4); and (c) separating a second hydrocarbon-containing material from the mixture, wherein the second hydrocarbon-containing material comprises a reduced amount of the source-derived contaminant and has the one or more characteristic within specification for the desired use (as shown in step 406 of FIG. 4).

In another embodiment, in any of the processes shown in FIGS. 1 and 2, the step of optional further processing may include carrying out steps such as steps (e) and (f) and may be carried out prior to the step of contacting, i.e., step (b), and in another embodiment, the step of optional further processing may include carrying out steps such as steps (e) and (f) and may be carried out both prior and subsequent to the other steps of the method.

The steps are substantially the same in the fourth embodiment as in the previously described embodiments. For the sake of brevity, the following description of FIG. 4 omits an extended description of the steps which are the same as in the previous embodiments. FIG. 4 illustrates a process similar to that shown in FIG. 3, but for simplicity FIG. 4 omits the steps of heating and regenerating the clay material as shown in both FIGS. 2 and 3, and the production of a second combustible material shown in FIG. 2, but it is to be understood that these steps may also be included in the process depicted in FIG. 4. As in the embodiments shown in and described with respect to FIGS. 2 and 3, the clay can be regenerated in situ in the column, without the necessity of removing the clay and then subsequently repacking the column with the regenerated clay.

FIG. 4 schematically depicts a process 400 for producing a hydrocarbon suitable for a desired use from a recycled polymeric or other organic material. As shown in FIG. 4, the process 400 includes, in step 402, providing a first hydrocarbon-containing material, which may be obtained from thermal decomposition of a recycled polymeric or other organic material. The source of the first hydrocarbon-containing material in FIG. 4 is shown in a dotted-line box to indicate that the process is not limited to a particular source. The possible sources are not limited, and include any source disclosed herein, such as polymeric materials, other organic materials, and synthetic hydrocarbon and petroleum-based materials. In accordance with this invention, the first hydrocarbon-containing material includes one or more source-derived contaminant and has one or more characteristic requiring adjustment for a desired use. In this embodiment, both the contaminants and the one or more characteristic may be the same as described above with respect to the other embodiments of the present invention.

In the next step of the embodiment shown in FIG. 4, in step 405, another hydrocarbon material is provided. The another hydrocarbon material may be from any suitable source. As shown in FIG. 4, the another hydrocarbon may be obtained from recycled petroleum-derived or synthetic hydrocarbon-containing materials or from other sources mentioned above. Since the invention of this embodiment is not limited to any particular source, the source is depicted in a dotted-line box in FIG. 4. In this embodiment, as in previously described embodiments, the another hydrocarbon material has one or more characteristic for offsetting the one or more characteristic of the first hydrocarbon material which requires adjustment if it is to be used for a particular desired use. In this embodiment, such desired uses include the same uses as described above for other embodiments, and may be any use to which a hydrocarbon material may be put.

In the next step of the embodiment shown in FIG. 4, step 403, the first hydrocarbon-containing material and the another hydrocarbon are blended together to obtain a blended hydrocarbon-containing material. In the blended hydrocarbon, the one or more characteristic is within specification for the desired use. In one embodiment, in the blended hydrocarbon, one or more of the characteristics may not be fully within specification until after the following step of contacting the blended hydrocarbon with the clay material. Thus, the blend may be formulated based on expected results of the contacting step, and the blended hydrocarbon-containing material itself may not actually meet the specifications, although the second hydrocarbon-containing material obtained in subsequent steps will meet such specification. FIG. 4 indicates that the blended hydrocarbon-containing material meets such specifications; this is for illustrative purposes, and is not intended to limit the invention.

In the next step of the embodiment of the process 400 shown in FIG. 4, in step 404, the blended hydrocarbon-containing material is contacted with a clay material to form a clay-hydrocarbon-containing material mixture. As a result of the contacting, in this embodiment as in the other embodiments, at least part of the source-derived contaminant is sorbed by the clay material, thus removing the contaminant from the blended hydrocarbon-containing material.

In the next step of the embodiment of the process 400 shown in FIG. 4, in step 406, a second hydrocarbon-containing material is separated from the clay-hydrocarbon-containing material mixture. As a result of the sorbing of the contaminants by the clay, the second hydrocarbon-containing material contains a reduced amount of the source-derived contaminant. As a result of the blending and the contacting, the second hydrocarbon material has the one or more characteristic within specification for the desired use.

As shown in FIG. 4, following the steps of the process 400 in accordance with this embodiment of the invention, in step 408, optional further processing may be applied to the second hydrocarbon material. Such further processing may include any blending, addition of additives, polishing by e.g., filtration through carbon or other materials, fractionation, distillation or other treatments, may be used to obtain a material suitable for any particular end use. As with all the embodiments of the present invention, such end uses may include, without limitation, use as motor vehicle fuel; use as fuel for ships, locomotives, etc.; use as fuel for electricity, heat and power generation; use as lubricant; use as a hydraulic fluid; use as solvent; consumer uses such as cooking fuel, oil lamp fuel, charcoal lighter; and any other use to which hydrocarbon materials may be put. Use as a hydraulic fluid may include, for example, a power transmission fluid such as brake fluid, transmission fluid, power steering fluid, or as other power-transmission fluid used, for example, in trucks and other heavy equipment.

As shown in FIG. 4, as a result of the process 400, a refinery-grade hydrocarbon material having characteristics within specification for a desired use may be obtained.

In each of the foregoing steps in this embodiment, the details of the steps are substantially the same as disclosed herein above with respect to the other embodiments.

As described in the foregoing, the present invention provides a very efficient system for removing contaminants from hydrocarbon materials, including the capability to regenerate and re-use the clay which the agent of removal of the contaminants. All of the foregoing embodiments have included the capability described in the following, in which the clay is regenerated in situ, in its packed condition in the column, without removing it from the column for the regeneration. It is noted that none of the processes described in relation to FIGS. 2 and 3 include any mention that the clay is removed from the column prior to the regeneration step.

In one embodiment, the present invention further relates to a process for removing at least one contaminant from a hydrocarbon containing a first quantity of the at least one contaminant, including contacting the hydrocarbon with a clay packed in a column at a temperature in the range from about 50° C. to about 180° C., wherein at least a portion of the at least one contaminant is sorbed by the clay and a clay-contaminant adduct is formed; removing the hydrocarbon from the column, wherein the removed hydrocarbon comprises a second quantity of the at least one contaminant, the second quantity being less than the first quantity; heating the clay and the clay-contaminant adduct in the column to a temperature in a range from about 400° C. to about 815° C. to regenerate the clay material, wherein the heating is carried out without removing the clay from the column; and re-using the regenerated clay material in further iterations of the process.

In another embodiment, the process for removing at least one contaminant from a hydrocarbon containing a first quantity of the at least one contaminant, includes contacting the hydrocarbon with a clay packed in a column at a temperature in the range from about 50° C. to about 180° C. and at a pressure in the range from 30 psi to about 1500 psi, wherein at least a portion of the at least one contaminant is sorbed by the clay and a clay-contaminant adduct is formed; removing the hydrocarbon from the column, wherein the removed hydrocarbon comprises a second quantity of the at least one contaminant, the second quantity being less than the first quantity; heating the clay and the clay-contaminant adduct in the column to a temperature in a range from about 400° C. to about 815° C. in the presence of oxygen to regenerate the clay material, wherein the heating is carried out without removing the clay from the column and at least a portion of the at least one contaminant is combusted; and re-using the regenerated clay material in the column in further iterations of the process.

In these embodiments, the process can be carried out on a continuous basis, by repeating the contacting, removing, heating and re-using, to that the continuous process is carried out in a more economical manner and without the necessity of stopping the process to remove clay and subsequently being required to re-pack the column with regenerated clay.

This feature of the present invention allows the clay, which has been used to remove the one or more contaminants, and has reached the point at which its removal capacity has been reduced to a level at which the removed hydrocarbon is not as clean as desired, to be regenerated in situ. In this embodiment, while the clay remains packed in the column in the same packed condition in which and in the same location at which it is used to contact the hydrocarbon and remove the contaminants from the hydrocarbon, it can be heated to the temperature range at which the clay-contaminant adduct can be broken down and the contaminant removed from the clay.

In one embodiment, for regeneration, the feed to the column of the hydrocarbon containing the quantity of the at least one contaminant is stopped. In one embodiment, the feed to the to-be-regenerated column is stopped and is simultaneously switched to another column packed with clay, so that the overall process can run without interruption. Once the flow of hydrocarbon material has been stopped, the bulk, but not all, of the hydrocarbon remaining in the column is suctioned out and replaced with air introduced through an opened air valve at the top of the column. Thus, air is continually introduced into the column during this regeneration process. Then, the top portion of the column is heated by, e.g., an external heat jacket or band, to the temperature in a range from about 400° C. to about 815° C. to ignite and combust the remaining hydrocarbon and contaminants remaining in the column with the air as source of oxygen for the combustion, to regenerate the clay. In one embodiment, atmospheric air is flowed into and through the column, to provide a source of oxygen so that the contaminants can be "burned out" of the clay. Of course, other oxygen sources (e.g., oxygen, ozone, nitrous oxide) could be used, but atmospheric air would normally be the most easily available and inexpensive. In one embodiment, the air or other source of oxygen is heated prior to its introduction into the column. As the oxygen encounters the contaminants caught in the clay, the contaminants are burned and destroyed, and thereby removed from the clay in the column.

In one embodiment, the air or other source of oxygen is pulled through the column by applying suction or a vacuum to the discharge end of the column. In one embodiment, the suction or vacuum is applied prior to heating to the above temperatures, to remove as much hydrocarbon material as possible prior to the heating and regeneration.

As will be understood, during the process of removing the at least one contaminant from the clay, the interstitial spaces in the clay particles become filled with entrapped particles (which of course may be very small) of the contaminant. The vast majority, and in some cases substantially all, of the contaminant is made up of materials that can be combusted with the exposure to oxygen and heat. During the regeneration, the contaminants are "burned out" of the interstitial spaces in the clay particles, and thereby the clay particles are regenerated for use in further removing of contaminants from hydrocarbon materials containing such (same or different) contaminants.

In these embodiments, the clay is allowed to remain packed in the column, substantially without being disturbed. That is, it is not disturbed in that it does not need to be moved, stirred, raked, plowed, agitated or rabbled or otherwise handled. As will be recognized, such moving, stirring, raking, or other handling will inevitably result in reduction of the particle size of the clay, and smaller particle sizes result in lower flow of hydrocarbon material through the clay. Such particle size reduction would be expected to occur in any process that involves removing the clay to another location for the regeneration. Thus, while prior art processes are known, e.g., Nichols et al., U.S. Pat. No. 2,387,936, for regenerating clay that has been used as an adsorbent, such processes inevitably break down and reduce the particle size of the regenerated clay, resulting in a much less efficient operation, in which higher pressures would be required to maintain the same flow rate of hydrocarbon through the clay, and/or a much lower flow rate at the same pressure would be obtained.

This feature avoids the necessity of removing the clay, carrying out the regeneration in some other apparatus, and then re-packing the clay into the column for re-use. This is a significant advance over any known prior art processes, and when this is coupled with the ability to remove substantially all of the contaminants in the hydrocarbon material subjected to the inventive process, a much more facile, economically advantageous process of provided.

Figure 5:
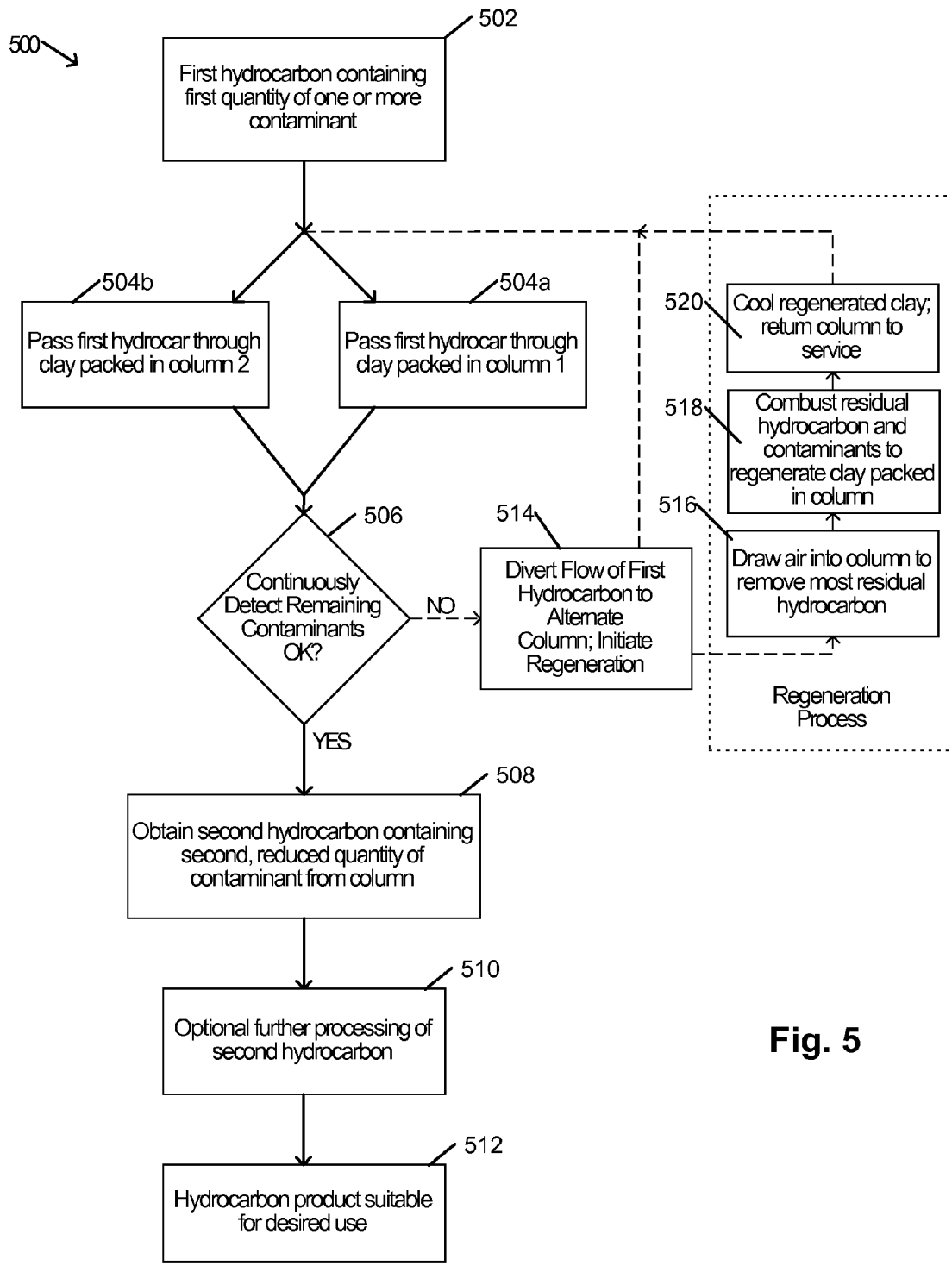
FIG. 5 is a schematic process flow diagram of a fifth embodiment of a process in accordance with the present invention.
Figure 6:
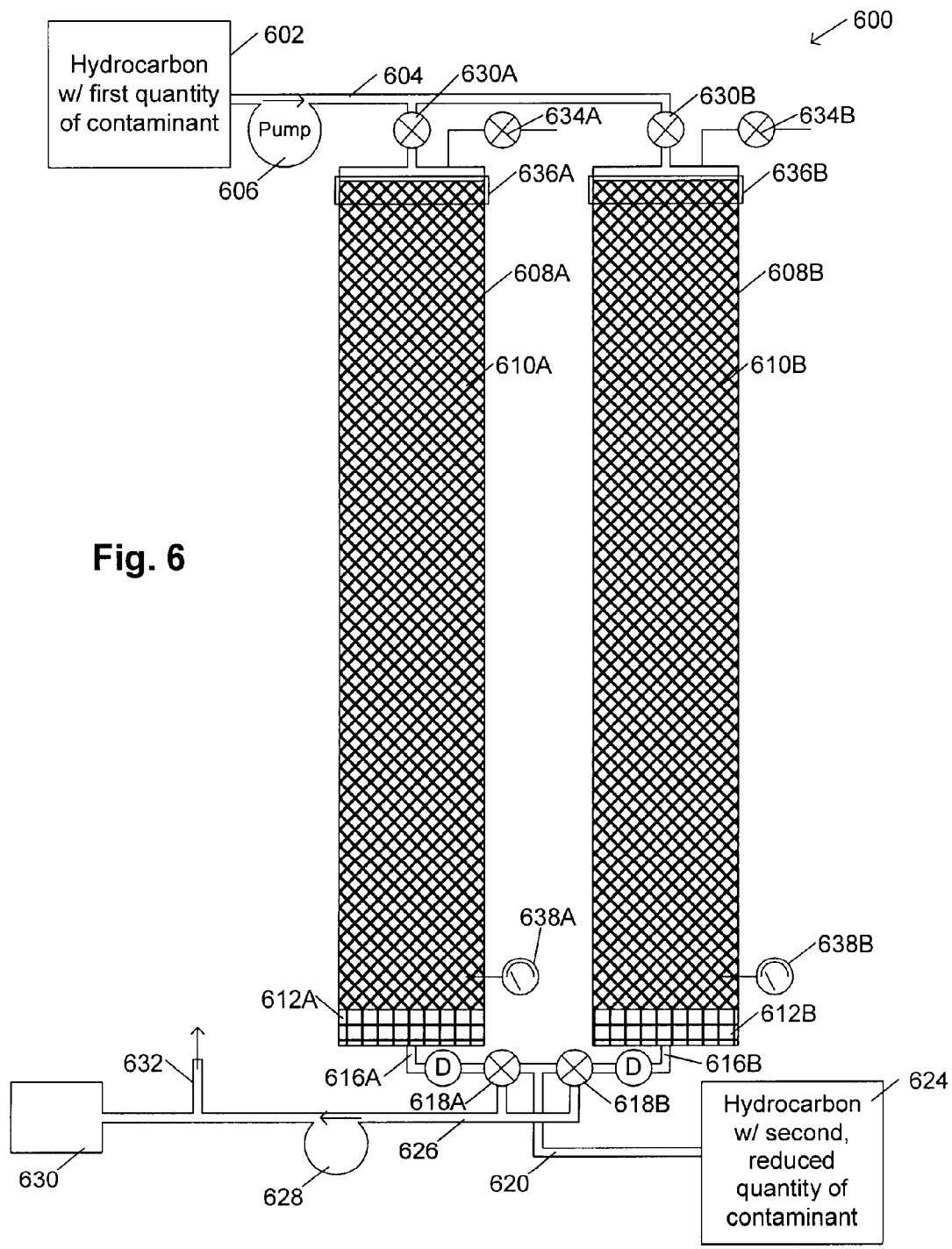
FIG. 6 is a schematic depiction of apparatus for carrying out a process in accordance with embodiments of the present invention, such as the process shown in FIG. 5.

FIG. 5 is a schematic process flow diagram of an embodiment of a process 500 in accordance with an embodiment of the present invention, as described in the foregoing. The process 500 illustrates both the removal of contaminants from a hydrocarbon by use of a clay packed in a column and regeneration of the contaminant-containing clay in situ, i.e., while the clay remains packed in the column. Thus, in accordance with this embodiment of the invention, the entire process described in the following with respect to FIGS. 5 and 6 is carried out with the clay remaining packed in the column, without the necessity of removing the clay for the regeneration.

As shown in FIG. 5, in step 502 a first hydrocarbon containing a first quantity of one or more contaminant is provided, in one embodiment, either to column 1 or column 2. In step 504a, the first hydrocarbon is passed through the clay packed in column 1, in which a clay-contaminant adduct is formed, and a hydrocarbon containing a second, reduced quantity of the contaminant emerges from the column 1. In this embodiment, the hydrocarbon exiting column 1 is passed through a detection apparatus in step 506. In step 506, a detector, such as a calorimeter, spectrophotometer or other suitable detection apparatus, examines the hydrocarbon exiting column 1 to determine whether the column has become saturated with contaminants and is no longer effectively removing contaminants. The detector detects, for example, an increase in a characteristic such as color (e.g., a darkening or an increase in one or more particular color component or an increase in one or more UV/visible/infrared detectable component) that reveals that the column has become saturated with one or more contaminant detected by the detector.

As shown in FIG. 5, as long as the detector in the step 506 determines that the contaminants are not present in the hydrocarbon emerging from the column 1, the second hydrocarbon containing a second, reduced quantity of contaminant is obtained, as shown in step 508. That is, this continues as long as the answer to the inquiry in the step 506 is "yes". As has been described with respect to other embodiments of the present invention, an optional step 510 may be included, in which the hydrocarbon containing a second, reduced quantity of the at least one contaminant may be subjected to further processing. Such further processing may include, for example, blending with other hydrocarbon materials as needed to make the product suitable for a given desired use. Whether or not such further processing is applied in the step 510, in step 512, a hydrocarbon product is obtained which is suitable for a desired use.

As shown in FIG. 5, when the detector in the step 506 determines that the one or more contaminant is present in the hydrocarbon emerging from the column 1 at a level that is predetermined to be unacceptable, and the second hydrocarbon containing a second, reduced quantity of contaminant is no longer being obtained, the process initiates the regeneration process, as shown in step 506, and diverts the flow of the first hydrocarbon to an alternate column, as shown in step 514. The flow diversion is indicated by the dashed line from the step 514 to the hydrocarbon flow line connecting from the step 502 to the steps 504a and 504b. That is, when the answer to the inquiry in the step 506 is "no", the regeneration process is initiated and the flow of the first hydrocarbon, containing the first quantity of one or more contaminants is diverted to an alternate column which, in the embodiment shown in FIG. 5 is column 2, in step 504b. Once the flow is diverted to column 2, steps 504b and 506 continue until the detector again detects an increase in contaminant content in the hydrocarbon exiting the column 2, as described above with respect to column 1, and the process continues by switching the flow to an alternate column. The alternate column may be a regenerated column 1 or it may be another column, not shown in FIG. 5.

In FIG. 5, the regeneration process is outlined by a dotted line, to indicate that it is separate from the primary flow of hydrocarbon material through the main process of steps 502-512.

As shown in FIG. 5, in the regeneration process, after flow of hydrocarbon to the column has been stopped, in a first step 516, air is drawn into the column through, e.g., an opened valve by, e.g., a suction pump. This step 516, in addition to drawing air into the column, removes most of the hydrocarbon in the column, although it leaves some residual portion of the hydrocarbon and all of the contaminants that have been removed from the hydrocarbon by the clay. With the air in the column, in the next step 518, the residual hydrocarbon in the column is combusted, which burns out both the residual hydrocarbon and substantially all of the contaminants, while the clay remains in situ in the column. Heat may be applied to the column, e.g., at the top of the clay, sufficient to ignite the hydrocarbon. During the regeneration process, the burning front of the hydrocarbon/contaminant mixture proceeds down the column, propelled by the hydrocarbon/contaminant fuel and the air flow resulting from the suction applied to the column.

When the combustion of the hydrocarbon and contaminants in the clay packed in the column is complete, e.g., the burning front has reached the bottom (or distal end, since this could be in a horizontally or otherwise angled column) of the column, the combustion ceases. For some time, air is drawn through the column to remove any gaseous combustion products and to cool the column, as shown in step 520. The column is then ready to return to service, as shown in step 520.

Based on the processes outlined in FIG. 5, the present invention can be carried out to provide the benefits discussed above.

FIG. 6 is a schematic depiction of apparatus 600 for carrying out a process in accordance with embodiments of the present invention, such as the process 500 shown in FIG. 5. The apparatus 600 depicted in FIG. 6 includes only two columns, but the process can be carried out with any number of columns, ranging from 1 column up to 50 or more columns, depending on the size of the operation and the optimal column size and capacity.

It is understood that the apparatus 600 depicted in FIG. 6 includes suitable controls, such as electric, electronic, pneumatic or manually-actuated controls, for controlling operation of the apparatus, but that these are not shown. Suitable controls can be implemented by any person of skill in the art of chemical engineering, as needed, in accordance with the present invention.

The apparatus 600 shown in FIG. 6 includes a source 602, such as a tank, of a hydrocarbon containing a first quantity of one or more contaminant. The hydrocarbon exits the source 602 via a line 604 and is pumped by a pump 606 to a pair of columns 608A and 608B. The columns 608A and 608B are packed with clay 610A and 610B. The columns 608A and 608B include a suitable clay-retaining means 612A and 612B at the bottom, to prevent loss of the clay through the bottom of the column. Any suitable, known retaining means may be used as the retaining means 612A and 612B, such as ceramic beads, steel beads, a strainer, a screen, one or more plates, one or more filters, etc.

Selection of flow into the column 608A or column 608B is controlled by a pair of feed valves 614A and 614B. During normal operation, one of these two feed valves 614A and 614B is open and the other(s) is closed, and they are switched when feed to the columns is switched, as described below.

During normal operation of each respective column 608A or 608B, the hydrocarbon is pumped into and through the clay bed in the column, and the contaminants, or substantially all of the contaminants, are removed by the clay. The hydrocarbon emerges from the column 608A or 608B via the line 616A or 616B, respectively. As shown in FIG. 6, the hydrocarbon emerging from the column passes through a detector D, which operates substantially as described above with respect to FIG. 5. During normal operation, the hydrocarbon passing through the line 616A or 616B passes through the detector D and a three-way exit valve 618A or 618B, and thence through the line 620 into a container 624, such as a tank, as the hydrocarbon with a second, reduced quantity of the one or more contaminant. As with the feed valves 614A and 614B, during normal operations, one of the exit valves 618A or 618B is open to the line 620 and the other(s) is closed to the flow of the hydrocarbon emerging from the column.

As described with respect to FIG. 5, when the detector D determines that the one or more contaminant is present in the hydrocarbon emerging from the column 608A or 608B in operation at a level that is predetermined to be unacceptable, and the second hydrocarbon containing a second, reduced quantity of contaminant is no longer being obtained from the column, the process initiates the regeneration process and diverts the flow of the first hydrocarbon to the alternate column. Thus, the detector D causes the open exit valve 618A or 618B to close, thus stopping flow of the hydrocarbon product to the line 620. Substantially at the same time, either the pump 606 is stopped or the open one of the feed valves 614A and 614B is closed and the other one opened, so to change the input of the hydrocarbon containing a first quantity of one or more contaminants to the alternate column.

During the regeneration process, the exit valve 618A or 618B on the column to be regenerated opens between the column 608A or 608B to be regenerated and the line 626. The line 626 is connected to a suction or vacuum pump 628, which is in turn connected to a container or tank 630 and an air exit line 632. At substantially the same time, an air valve 634A or 634B is opened at the top of the column to be regenerated, and the pump 628 is activated. The pump 628 pumps most of the hydrocarbon that remains in the column to be regenerated out of the column and into the tank 630. Since the air valve 634A or 634B at the top of the column to be regenerated has been opened, the hydrocarbon removed from the column is replaced with air. As the hydrocarbon is removed, and air breaks through, it is passed out through the air valve 632.

Next, during the regeneration process in this embodiment, heat is applied by a heater 636A or 636B, located at or near the top of the column, in the vicinity of the upper surface of the clay packed in the column. This heat is applied while the pump 628 continues to pull air in via the air valve 634A or 634B. The combination of air and hot hydrocarbon soon ignites, resulting in combustion of the hydrocarbon and substantially all of the contaminants remaining in the column. As described elsewhere in this specification, the clay in the column is thus heated to a temperature in the range from about 400° C. to about 815° C., during the combustion. This "burns out" substantially all of the hydrocarbon and contaminants in the column, opens pores among the clay particles, and regenerates the column for further use in the process of the present invention. When the burning reaches the distal or bottom end of the column under regeneration, the pump 632 continues to pull air into and through the column to flush out any remaining combustion gases and to cool the clay packed in the column, in preparation for further use.

During the regeneration heating and cooling, the temperature in the column 608A or 608B under regeneration may be monitored by one or more temperature sensor 638A or 638B. While only one temperature sensor 638A and 638B is shown in each column in FIG. 6, a plurality of the temperature sensors may be employed, arrayed along the length of the column, in order to better monitor progress of the burning front and subsequent cooling, during the regeneration process. Of course, the temperature sensors 638A and 638B may also be used to monitor temperature in the column during the primary process of removing contaminants from the hydrocarbon.

Thus, as described in the foregoing, in accordance with these embodiments of the present invention, the process for removing at least one contaminant from a hydrocarbon containing a first quantity of the at least one contaminant, includes contacting the hydrocarbon with a clay 610A or 610B packed in a column 608A or 608B at a temperature in the range from about 50° C. to about 180° C., in which at least a portion of the at least one contaminant is sorbed by the clay and a clay-contaminant adduct is formed; removing the hydrocarbon from the column, wherein the removed hydrocarbon comprises a second quantity of the at least one contaminant, the second quantity being less than the first quantity; heating the clay 610A or 610B and the clay-contaminant adduct in the column to a temperature in a range from about 400° C. to about 815° C. to regenerate the clay material, in which the heating is carried out without removing the clay 610A or 610B from the column 608A or 608B; and re-using the regenerated clay material in further iterations of the process.

The following describes an embodiment of the regeneration process in accordance with an embodiment of the present invention. During normal processing, the hydrocarbon to be processed is pumped by a feed pump under pressure into the top or proximal end of a column through a computer controlled valve. The hydrocarbon emerging from the bottom or distal end of the column is monitored by a computerized spectrometer that reads the fluid color so that when the color reading increases to the set point, the feed pump is automatically turned off and a vacuum pump downstream of the column is turned on. At the same time, an air control valve at the top or proximal end of the column opens. As a result, any hydrocarbon remaining in the packed clay in the column is removed. The vacuum pump operation is timed to assure that later on in the process, only air is removed. Once the remaining hydrocarbon has been substantially removed from the column, an electric heat belt is activated near the top of the column, forming oil vapor that rises. The oil vapor is ignited by the hot electric belt and the hot vapor, resulting smoke and, most importantly, the flames from the combustion of the hydrocarbon remaining in the column are drawn down through the packed clay in the column. The flames incinerate any combustible material such as sulfur, carbon, hydrocarbon, etc., opening the cells in the clay and thus allowing it to be used again and again. At the end of the burn, the vacuum pump increases its speed and draws more air into the column, allowing it to cool. Once the temperature reaches, e.g., about 100° F. (about 37° C.), the column is ready to be returned to service for treating the hydrocarbon.

Although the invention has been shown and described with respect to certain preferred embodiments, equivalent alterations and modifications will occur to others skilled in the art upon reading and understanding this specification and the annexed drawings. In particular regard to the various functions performed by the above described integers (components, assemblies, devices, compositions, steps, etc.), the terms (including a reference to a "means") used to describe such integers are intended to correspond, unless otherwise indicated, to any integer which performs the specified function of the described integer (i.e., that is functionally equivalent), even though not structurally equivalent to the disclosed structure which performs the function in the herein illustrated exemplary embodiment or embodiments of the invention. In addition, while a particular feature of the invention may have been described above with respect to only one of several illustrated embodiments, such feature may be combined with one or more other features of the other embodiments, as maybe desired and advantageous for any given or particular application.

What is claimed is:

1. A process for removing at least one contaminant from a hydrocarbon containing a first quantity of the at least one contaminant, comprising:
    contacting the hydrocarbon with a clay packed in a column at a temperature in the range from about 50° C. to about 120° C., wherein at least a portion of the at least one contaminant is sorbed by the clay and a clay-contaminant adduct is formed;
    removing the hydrocarbon from a discharge end of the column, wherein the removed hydrocarbon comprises a second quantity of the at least one contaminant, the second quantity being less than the first quantity;
    heating the clay and the clay-contaminant adduct in the column to a temperature in a range from about 400° C. to about 815° C. to regenerate the clay material, wherein the heating is carried out without removing the clay from the column; and
    re-using the regenerated clay material in further iterations of the process,
    wherein the hydrocarbon is a liquid in the contacting and removing, and prior to the heating, remaining hydrocarbon is removed from the column by applying suction or a vacuum to the discharge end of the column, and during the heating, the suction or vacuum is continued to pull a source of oxygen into the column.

2. The process of claim 1 wherein the process does not include additional or separate steps to remove any contaminant from the hydrocarbon after the contacting step.

3. The process of claim 1 wherein the at least one contaminant comprises one or more of an organic chlorine compound, a nitrogen compound, sulfur or an organic or inorganic sulfur compound, color, or an offensive or non-hydrocarbon odor.

4. The process of claim 1 wherein the hydrocarbon is obtained from thermal decomposition of polymeric or other organic materials.

5. The process of claim 1 wherein the hydrocarbon is a recycled lubricating oil, gear oil or fuel oil.

6. The process of claim 1 wherein the clay comprises Fuller's earth.

7. The process of claim 1 wherein the source of oxygen comprises atmospheric air.

8. The process of claim 1 wherein at least a portion of the at least one contaminant is combusted during the heating.

9. The process of claim 1 wherein the removed hydrocarbon material is not subjected to either cracking or fractionation subsequent to the removing.

10. The process of claim 1 wherein the hydrocarbon is passed through the column under pressure, and the steps of contacting and removing are carried out in a single operation.

11. The process of claim 1 wherein the contacting is carried out at a pressure in the range from 30 psi to about 1500 psi.

12. The process of claim 1 further comprising repeating the contacting, removing, heating and re-using in a continuous process.

13. A process for removing at least one contaminant from a hydrocarbon containing a first quantity of the at least one contaminant, comprising:
    contacting the hydrocarbon with a clay packed in a column at a temperature in the range from about 50° C. to about 120° C. and at a pressure in the range from 30 psi to about 1500 psi, wherein at least a portion of the at least one contaminant is sorbed by the clay and a clay-contaminant adduct is formed;
    removing the hydrocarbon from a discharge end of the column, wherein the removed hydrocarbon comprises a second quantity of the at least one contaminant, the second quantity being less than the first quantity;
    heating the clay and the clay-contaminant adduct in the column to a temperature in a range from about 400° C. to about 815° C. in the presence of oxygen to regenerate the clay material, wherein the heating is carried out without removing the clay from the column and at least a portion of the at least one contaminant is combusted; and
    re-using the regenerated clay material in the column in further iterations of the process,
    wherein the hydrocarbon is a liquid in the contacting and removing and, prior to the heating, remaining hydrocarbon is removed from the column by applying suction or a vacuum to the discharge end of the column and, during the heating, the suction or vacuum is continued to pull the oxygen into the column.

14. The process of claim 13 further comprising repeating the contacting, removing, heating and re-using in a continuous process.

15. A process for removing at least one contaminant from a hydrocarbon containing a first quantity of the at least one contaminant, comprising:
    contacting the hydrocarbon with a clay packed in a column, wherein the hydrocarbon is flowed through the clay and at least a portion of the at least one contaminant is sorbed by the clay and a clay-contaminant adduct is formed;
    removing the hydrocarbon from a discharge end of the column, wherein the removed hydrocarbon comprises a second quantity of the at least one contaminant, the second quantity being less than the first quantity and wherein the clay retains residual hydrocarbon;
    heating a portion of the clay and the clay-contaminant adduct in the column in the presence of air to a temperature at which the residual hydrocarbon ignites and undergoes combustion with the air, wherein the heating and combustion is carried out while the clay remains packed in the column; and
    re-using the regenerated clay material in further iterations of the process, wherein the hydrocarbon is a liquid in the contacting and removing and, prior to the heating, remaining hydrocarbon is removed from the column by applying suction or a vacuum to the discharge end of the column and, during the heating, the suction or vacuum is continued to pull the air into the column.

16. The process of claim 15 wherein the column is a first column of a plurality of columns, each column packed with clay, and the process further comprises flowing the hydrocarbon into a second column of the plurality of columns during the heating of the first column.

17. The process of claim 15 wherein at least a portion of the contaminant undergoes combustion with the residual hydrocarbon.

18. The process of claim 15 wherein the air is admitted to the column prior to and during the heating.

* * * * *